(12) United States Patent
Hollander et al.

(10) Patent No.: US 11,513,052 B2
(45) Date of Patent: Nov. 29, 2022

(54) CHARACTERIZATION OF POROUS MATERIALS USING GAS EXPANSION INDUCED WATER INTRUSION POROSIMETRY

(71) Applicant: University of Manitoba, Winnipeg (CA)

(72) Inventors: Hartmut Michael Hollander, Winnipeg (CA); Miad Jarrahi, Winnipeg (CA); Douglas W. Ruth, Winnipeg (CA); Mohamed Bassuoni, Winnipeg (CA)

(73) Assignee: University of Manitoba, Winnipeg (CA)

( * ) Notice: Subject to any disclaimer, the term of this patent is extended or adjusted under 35 U.S.C. 154(b) by 418 days.

(21) Appl. No.: 16/662,384

(22) Filed: Oct. 24, 2019

(65) Prior Publication Data

US 2020/0132584 A1    Apr. 30, 2020

Related U.S. Application Data

(60) Provisional application No. 62/752,026, filed on Oct. 29, 2018.

(51) Int. Cl.
*G01N 7/10*   (2006.01)
*G01N 15/00*  (2006.01)
*G01N 15/08*  (2006.01)

(52) U.S. Cl.
CPC ..... *G01N 15/0826* (2013.01); *G01N 15/0806* (2013.01); *G01N 7/10* (2013.01); *G01N 15/00* (2013.01); *G01N 15/088* (2013.01)

(58) Field of Classification Search
CPC .......... G01N 15/0826; G01N 15/0806; G01N 15/088; G01N 7/10; G01N 15/00
See application file for complete search history.

(56) References Cited

U.S. PATENT DOCUMENTS

2003/0066339 A1\* 4/2003 Chavdar ............ G01N 15/0893
                                                  73/38
2003/0200788 A1\* 10/2003 Newbound .............. G01N 7/10
                                                  73/31.03

(Continued)

OTHER PUBLICATIONS

Rouquerol et al. ("Liquid intrusion and alternative methods for the characterization of macroporous materials (IUPAC Technical Report)" Pure and Applied Chemistry, vol. 84, No. 1, 2011, pp. 107-136. https://doi.org/10.1351/PAC-REP-10-11-19) (Year: 2011).\*

(Continued)

*Primary Examiner* — Daniel R Miller
*Assistant Examiner* — Christian T Bryant
(74) *Attorney, Agent, or Firm* — Kyle R Satterthwaite; Ryan W Dupuis; Ade & Company, Inc.

(57) ABSTRACT

Determination of transport phenomena properties in porous media is one major objective of core analysis studies in petrophysics, reservoir engineering, and groundwater hydrology. Porosity measurement may be considered as a key factor to identify the hydraulic performance of a low permeable porous medium (e.g. rock or concrete). Additionally, the rate of absorption under pressure depends on the permeability, which is related to the connectivity between the existing pores within the porous structure. An alternative Gas Expansion Induced Water Intrusion Porosimetry (GEI-WIP) method and apparatus is useful to measure the total porosity and pore size distribution, using a gas/water intrusion apparatus for water tight materials.

18 Claims, 7 Drawing Sheets

(56) References Cited

U.S. PATENT DOCUMENTS

2008/0276690 A1* 11/2008 Gupta .................. G01N 15/088
  73/38
2010/0104717 A1* 4/2010 Zeller ....................... A23F 5/40
  426/443

OTHER PUBLICATIONS

Harkness et al. (The use of a novel water porosimeter to predict the water handling behaviour of gas diffusion media used in polymer electrolyte fuel cells, Journal of Power Sources, vol. 193, Issue 1, 2009, pp. 122-129, ISSN 0378-7753,) (Year: 2009).*
Wikipedia: Inert Gas, Wayback Machine Capture, Aug. 15, 2018, https://web.archive.org/web/20180815132927/https://en.wikipedia.org/wiki/Inert_gas (Year: 2018).*
Fang et al. (A Mercury Intrusion Porosimetry Method for Methane Diffusivity and Permeability Evaluation in Coals: A Comparative Analysis. Appl. Sci. May 2018, 8, 860. https://doi.org/10.3390/app8060860) (Year: 2018).*
Drake et al. (Pore-Size Distribution in Porous Materials, Industrial & Engineering Chemistry 1949 41 (4), 780-785 DOI: 10.1021/ie50472a024 (Year: 1949).*
Glover (Formation Evaluation MSc Course Notes, Chapter 5: Porosity, Internet Archive capture Aug. 28, 2017, https://web.archive.org/web/20170828220541/http://homepages.see.leeds.ac.uk/~earpwjg/PG_EN/CD%20Contents/Formation%20Evaluation%20English/Chapter%205.PDF (Year: 2017).*

* cited by examiner

CHARACTERIZATION OF POROUS MATERIALS USING GAS EXPANSION INDUCED WATER INTRUSION POROSIMETRY

BACKGROUND

Porosity and permeability measurement are recognised as an important evaluation of structural materials such as concrete, as these parameters influence the structural and durability properties significantly. Permeable and porous structure of concrete may cause various durability problems and compromise its performance. During the hydration process, factors such as aggregates, interface between aggregates and cement paste, degree of hydration, consolidation, water-to-cementitious materials ratio, rheology, and curing conditions determine the volume of voids and their distribution within the hardened solid paste, which in turn defines the concrete porosity (Brown et al., 1993). Therefore, porosity data contributes to our understanding of the nature of concrete and impacts concrete strength, resistivity, applicability, and service life. The resistance of concrete to chemical attack and physical degradation is directly related to the permeability. The distribution of pores is associated with the potential transport processes of moisture and aggressive ions, which can cause alkali-silica expansion, sulfate attack, corrosion of embeded reinforcement, etc. (Roy et al., 1993).

A continuous network of pores encompasses different sizes from tiny pores in the cementitious matrix of concrete (i.e. order of magnitude of 1 nm), to large pores in the interfacial regions with aggregate (i.e. order of magnitude of 10 μm). The physical significance of pore size distribution (PSD) in concrete encompasses the "voids", as coarse pores, the "capillary pores", as the middle size pores, and the "gel pores", as the fine pores (Roy et al., 1993).

The intrinsic complication of pore size distributions has led a lot of studies to develop experimental approaches capable of quantifying such geometric properties of porous materials. Recently, Xiong et al. (2016) reviewed the experimental characterisations of pore network of porous media in transport phenomena. The reviewed methods included imaging techniques like X-ray computed micro-tomography (micro-CT), nuclear magnetic resonance (NMR), focused ion beams (FIB), scanning electron microscopy (SEM), mercury intrusion porosimetry (MIP), and gas adsorption. Other recent work includes CT scan of a concrete sample at a low cost by (du Plessis et al., 2016). The pore structure of cementitious materials was evaluated, using electrical impedance methods (Tang et al., 2016). The simple and inexpensive bleeding test was conducted on fresh concrete to obtain the permeability and bulk modulus (Ghourchian et al., 2016). As a limitation of their test, concrete was required to be fresh so that the self-weight bleeding rate could be measured. The fractality of pores was tested through MIP on cement paste (Gao et al., 2016). Their MIP results showed that the solid mass was the most probable fractal type. MIP was also used to characterize the micropore structures of the cement pastes, comprising ground granulated blast-furnace slag (GGBFS) (Choi et al., 2017). They indicated that the change in GGBFS ratio might cause different total porosity evolution in the cement paste at its early ages comparing to its later ages. Therefore, among other methods, MIP seems to be considered as a popular tool to evaluate the pore structure of cement paste and concrete in recent studies.

The MIP is a mathematical description of the distribution of pores with different sizes (Roy et al., 1993). Diamond and Dolch (1972) suggested a single lognormal distribution as a description of pores in concrete determined by MIP. A combination of three lognormal distributions, using a cumulative percentage of pore volume with respect to the total pore volume, has been applied to characterize the pore size distribution (Roy et al., 1993). The mercury intrusion measurement can be integrated with the Washburn model (Washburn, 1921a) to evaluate the diameter of cylindrical pores filled at each intrusion pressure. However, the Washburn model is only valid for a porous systems made up of cylindrical pores with specific diameters, all connected to the outer surface directly through pores with a larger diameter. Obviously, not all porous materials conform to such a model. Concrete, as a hydrated cement-based material, has been shown to have two main incompatibilities with the Washburn model: (i) pores were reported with the exhibition of a high degree of convolution (Wang and Diamond, 1994), and considerably fractal character (Wang, 1995), that can hardly be assumed to have a cylindrical shape; (ii) the interior pores were accessible to mercury indirectly through percolated chains of finer pores known as "ink-bottle" connected pores (Diamond, 2000). Windslow and Diamond (1969) indicated that the filling process of cement pastes during MIP was irrespective of the pore sizes, thus leading to inaccurate pore size distributions. More likely, in concrete, the existence of channels and micro-cracks may expose pores to mercury at relatively lower pressures (Diamond, 2000). Therefore, at each operating pressure, larger pores that are surrounded by finer pores, cannot be captured by the Washburn-based MIP test. Moreover, the equilibrium geometry of liquid-solid interfaces of mercury, a non-wetting fluid, and grain walls leads to a convex meniscus and an opposing capillary action, preventing mercury to penetrate into the pores (Herbert, 2006). This raises two main drawbacks of using mercury for porosimetry. First, due to the high surface tension of mercury, high levels of pressure are required to force the mercury into the void spaces. Second, only pores that are connected to the material outer surface will be penetrated. This may encourage the use of a wetting fluid for porosimetry, instead of mercury, to apply lower pressures and fill smaller pores that are not interconnected. Wang et al. (1997) introduced a permeability test on concrete samples using water. They measured the permeability by permeating water from top to bottom of the sample. The surface water drop was recorded once a day at a pressure head of about 300 mm. The permeability was reported along with the crack opening displacement in concrete (Wang et al., 1997). The total porosity of shale samples has been measured using the water immersion porosimetry (WIP) technique (Kuila et al., 2014). The samples were saturated with deionized water under a constant pressure of 13.7 MPa (2000 psi) for 24 h. They reported the benefit of using water instead of mercury in low permeable gas shale samples. Moreover, the capillary transport of water in mortars and concrete has been studied to observe the time dependency of capillary sorption of water (Martys and Ferraris, 1997). They suggested an empirical relationship to define the volume of water absorbed within a long time period of 10 to 20 days.

One of the most accurate and rapid techniques for the determination of porosity of rocks is the method of gas expansion (Washburn and Bunting, 1922). It has been used in many experimental studies such as Ernest (1926), Luffel et al. (1992), and Karastathis (2007). In this method, the gas at an initial pressure was allowed to expand and fill the pores within a short time period (i.e. 5-15 min). The pore volume was obtained by measuring the corresponding pressure drop from an initial value to the final state. The governing relationship between the pressure drop and the expanded volume was derived based on Boyle's law (Anovitz and Cole, 2015). However, porosity was the only transport parameter that could be measured with this method as no pressure-time history was recorded during the expansion process due to the fast penetration of gas. Additionally, Boyle's law is only valid when the expansion process is isothermal, where the system is in thermodynamic equilibrium. It is a challenge to maintain the equilibrium status during the gas expansion test as the gas penetration process is a fast process and deviates from thermodynamic equilibrium.

Pore size distribution of porous materials shows the volume of micro pores, meso pores, and macro pores which is an important description of the pore structure. In microporous (pore size up to 2 nm) and mesoporous (pore size 2 to 50 nm) materials, the fine pores (i.e. nano pores) have a significant contribution to the total porosity of the matrix. Pore structure characterization of these materials is mostly affected by the pore sizes ranged between 1 and 50 nm. Diamond (1970) reported the portion of pore sizes in the range of 10-200 nm in a clay type material, Macon, Georgia kaolinite, was 0.22 cm$^3$/g out of 0.27 cm$^3$/g of the total pores specific volume. Similar portions of nano pores were seen in the other types of clay such as Fithian illite, Clay Spur montmorillonite, and Garfield nontronite (Diamond, 1970).

An example of a micro-mesoporous material is a shale gas rock due to the existence of organic material and clays. In shale gas reservoirs, a major portion of the total porosity is distributed in nano pores (Clarkson et al., 2013). However, the natural fractures as a result of the tectonic stress and pore fluid pressure may increase the pore sizes in a shale gas rock. Therefore, a tailored analysis of the pore structure of shale gas rock requires a knowledge of all pores including the micro pores (Bustin et al., 2008). The fluid flow mechanisms and the hydraulic properties such as hydraulic conductivity and storativity of these types of rock (i.e. shaly rocks) highly depend on their pore size distribution (Clarkson, 2011). Cement-based materials are another example of micro-mesoporous materials in which finer pores have a larger density of pore volume than the larger pores. The pore sizes distribute from nano pores, known as gel pores (1-100 nm), to mesopores, known as capillary pores (100 nm-10 μm), and macro pores (10 μm -1 cm) (Gong et al., 2014). Different distributions of gel pores, capillary pores, and macro pores cause different physical properties in cement pastes, mortar, and concrete.

Many basic and comprehensive methods are developed and being used to study the pore size distributions in micro-mesoporous materials. As an example, the total porosity and pore size distribution of reference clays, naturally-occurring subsoils, and commercial clay samples were obtained using mercury porosimetry (Diamond, 1970). In this study, the minimum equivalent pore diameter was approximately 15 nm and the maximum was several hundred microns. The contact angle of mercury on montmorillonite, kaolinite, and illite were measured to be 139° and 147° for the rest of two, respectively. As mercury is a non-wetting fluid, its contact angle is greater than 90°. Thus, mercury would not intrude the pores of the matrix spontaneously, in turn, requires an external pressure to be applied to the pores. This physical principle was the basis of the mercury intrusion porosimetry (MIP) and applied by Ritter and Erich (1948), Winslow and Shapiro (1959) and many others. In this method, the minimum diameter d (m) of a cylindrical pore that can be intruded by mercury at the pressure P (Pa) was given by Washburn (1921b):

$$d = -\frac{4\sigma\cos(\theta)}{P} \quad (A1)$$

where $\sigma\left(\frac{N}{m^2}\right)$ is the surface tension of mercury, and θ (°) is the contact angle.

Here, the contact angle depends on the material type and remains constant during the test. Generally, the size distribution that was detected by MIP measurement was between 2 nm to slightly larger than 50 nm as equivalent pore diameter (Clarkson et al., 2013). The pore size distribution in the cement-based materials was characterized in the range of 1 nm to 10 μm through MIP measurement. However, the larger pores in the range of 10 μm to 1 cm of cement-based materials structure were not detected by the MIP method (Gong et al., 2014). Willis et al. (1998) replaced the mercury with Wood's metal and characterized the pore size distribution. As of their results, the distribution was unable to capture the fine pores and exhibited larger pore sizes compared to MIP measurements.

MIP test can be performed on a clean and dry sample, whereas drying process may alter the porosity of the sample (Bustin et al., 2008). Gallé (2001) studied the effect of different drying processes (vacuum-drying, oven-drying at 60° C. and 105° C., and freeze-drying) on MIP results and concluded that oven-drying is not proper for MIP test as it triggers microstructure evolution and mechanical damages to the solid matrix.

Despite the constant contact angle, the capillary force may increase when the diameter of a pore decreases. This may occur when mercury meets the pore throat which may require a higher pressure to fill the pore throat. In ink-bottle connected pores, where the pore throat is connected to a larger pore, the capillary force decreases while mercury fills the large pore by the same pressure that was increased at the vicinity of the pore throat. According to this dilemma, the volume that is assigned to the fine pore diameter might be larger than reality. As a result, the pore volume of finer pores can be overestimated in MIP. In a comparison of the pore size distribution results obtained from MIP measurements and scanning electron microscope (SEM) method, the MIP results showed misallocated pore volumes (Diamond, 2000). Furthermore, the assumption of cylindrical pore geometry in MIP measurements causes an imperfect pore size distribution where the pore structure has high convolution. In addition, the size of the sample for mercury intrusion porosimetry is limited by the capacity of the intrusion readout system (Diamond, 1970).

The capillary condensation method (Chang, 2016; Rouquerol et al., 1999; Sarkisov and Monson, 2000; Tanaka et al., 2000) is another common approach to detect the pore size distribution. When vapour pressure in a capillary void is not zero, the vapour condenses to form a film of liquid, adhesive to the walls of the void, due to the van der Waals attraction force interactions between vapour phase molecules. If the vapour pressure increases, the condensation continues to reach the equilibrium vapour pressure which is less than saturation vapour pressure. In this method, the vapour pressure $P_v$, that causes the capillary condensation, was defined by the Kelvin equation (Gong et al., 2014):

$$\ln\left(\frac{P_v}{P_S}\right) = -\frac{4H\gamma V_m}{DRT} \quad (A2)$$

where $P_S$ is the saturation vapour pressure, $D$ (m) the diameter of the capillary void, $$V_m\left(\frac{m^3}{mol}\right)$$

the molar volume of the liquid, $T$ (K) the temperature, and $R$ the molar gas constant. The minus sign in the right-hand side stands for the negative value of the radius of curvature for concave surfaces. The ratio $$\frac{P_v}{P_S}$$

is the measure of relative humidity. The capillary condensation causes sorption of an intrusion substance that may lead to the pore size distribution characterization in a porous material. In general, this method is able to detect mesopores up to the order of 100 nm. In the case of using nitrogen as intruded isotherm (Barrett et al., 1951), surface adsorption is the main phenomenon that measures the surface of the pores. Nitrogen sorption is free of external pressure and requires a temperature as low as 77 K. A multilayer adsorption model, known as BET theory, was developed using nitrogen sorption by considering the Kelvin equation in a cylindrical pore (Barrett et al., 1951). Brunauer et al. (1967) developed an empirical method to expand the BET model to be applied to any kind of pore geometry. Therefore, the nitrogen sorption method took advantage of the BET model to address the pore size distribution regardless of pores shape, however, it did not reflect the effect of capillary condensation as it was only based on surface adsorption (Daian, 1988). Furthermore, the PSD obtained from gas adsorption techniques incorporates several undesired physical phenomena leading to an improper analysis of adsorption data such as: the adsorbate phase transitions, monolayer formation in combined micro- and mesoporous materials, and the tensile strength effect (Groen et al., 2003).

Following the covered limitations of gas adsorption, water was used as the intrusion isotherm. According to the Kelvin equation, the relation between the vapour pressure of water and the curvature of water-vapour interface was provided (Fisher et al., 1981). It was investigated that the vapour of water condenses in channels of adequately small dimensions. In their study, it was verified that the Kelvin equation provides reliable results for meniscus radii as small as 4 nm at a humidity of 0.945 to 0.996. The thickness $D_{men}$ of capillary-condensed water within an unsaturated slit-shaped pore was given as follows (Fisher et al., 1981):

$$D_{men} = \frac{2\gamma V_m}{RT \ln(P_v/P_S)} + 2Z_1 - \frac{2}{RT \ln(P_v/P_S)} \int_{Z_1}^{-0.5D_{men}} \frac{0.43RT}{Z} dZ \quad (A3)$$

where $Z$ is the normal distance from the solid surface of the pore. The integral of $$\frac{RT}{Z}$$

is the adsorption isotherm of water on a flat surface, where $Z_1$ (nm) is equal to $-0.43/\ln(P_v/P_S)$ (Fisher et al., 1981). The thicknesses of up to 200 nm of capillary-condensed water, obtained from their experiment, were in a good agreement with Eq. (A3).

Another example of an application of capillary-condensed water is water sorption that was studied by Baroghel-Bouny (2007). The water sorption and nitrogen sorption were shown to be agreeable at a relative humidity higher than 0.3 (Koronthalyova, 2011). The relationship between the water saturation and pore radius was provided by Coussy (2011). They used van Genuchten's equations (van Genuchten, 1980), which is an equation for predicting hydraulic conductivity of unsaturated soils. The water adsorption isotherm was ascribed to the pore size distribution of cement-based materials using moisture chemical potential of water (Gong et al., 2014). Under thermodynamic equilibrium, that equals the chemical potential of water and its vapour. The shape of the adsorption isotherm curve was used to estimate the cumulative pore-size distribution of cement paste up to 100 nm. Then, the resultant PSD was combined with empirical pore size distribution functions, obtained from image analysis, for pores larger than 100 nm to generate a full range pore size distribution of a concrete or a mortar. Earlier, the water sorption was applied with the help of nitrogen sorption and mercury intrusion to determine the pore size distribution in cement mortar (Daian, 1988). It was claimed that the MIP shows an overestimation of the pores volume because of ink-bottle connected pores.

Even though there are studies to apply water to characterize pore size distribution, a uniquely practical approach, without the obligation of combining different methods to cover the full range of pores (i.e. gel pores, mesopores, and macro pores) of the concrete materials is still absent.

In view of the forgoing, there remains a need for improved and alternative approaches to porosimetric analysis of materials.

SUMMARY OF THE INVENTION

According to one aspect of the invention, there, is provided an apparatus for porosimetric analysis of a material, said apparatus comprising:
  an accumulator tank for holding water therein together with a pressurized gas acting on said distilled de-aired water (DDW); and
  a sample vessel for holding a material sample within a sealed internal environment of said sample vessel;
  a fluid path by which the sealed internal environment of said sample vessel is fluidly communicable with the accumulator tank to introduce said water from the accumulator tank into said sealed internal environment of the sample vessel under pressure exerted by said pressurized gas.

According to another aspect of the invention, there is provided a method of performing porosimetric analysis of a material, said method comprising:
  (a) from an accumulator containing water and pressurized gas, using said pressurized gas to force said water from said accumulator into a material sample located within a fully closed or closable environment;

(b) with said environment in a fully closed state from which the water cannot escape, allowing continued flow of said water into the material sample until pressure in the accumulator has stabilized; and (c) determining a volume of water intruded into the material sample based at least partly on a volumetric change of the pressurized gas in the accumulator from an initial time preceding step (a) to a final time after the pressure has stabilized in step (b), and using said determined volume of water to derive one or more porosimetric characteristics of said material sample.

BRIEF DESCRIPTION OF THE DRAWINGS

One embodiment of the invention will now be described in conjunction with the accompanying drawings in which.

DETAILED DESCRIPTION

Figure 1:
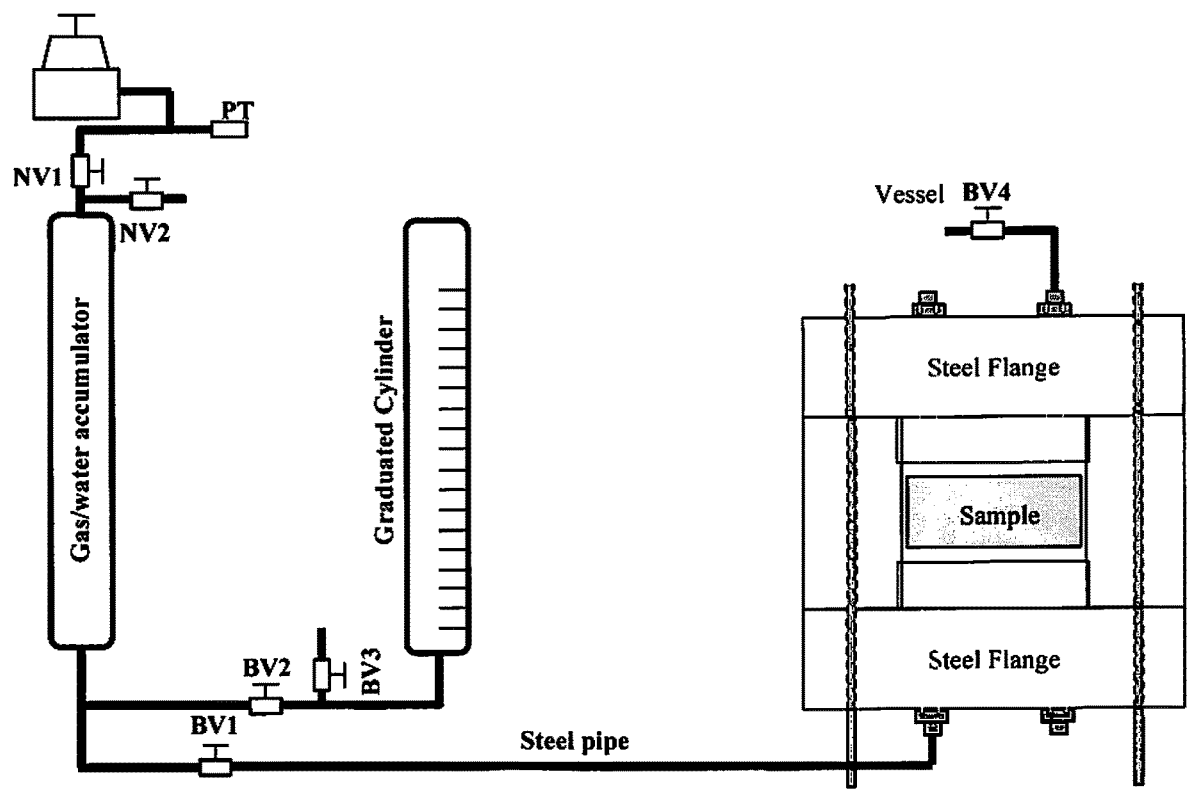
FIG. 1 schematically illustrates a gas/water intrusion apparatus of the present invention for performing porosimetric analysis of a material sample by using a gas/water accumulator to induce water into the pores of the sample, whereon the change in gas volume can be used to measure the porosity of the material.

Disclosed herein is a novel gas/water intrusion apparatus that modifies the prior gas expansion method to create a novel type of Porosimetry, which is referred to herein as Gas Expansion Induced Water Intrusion Porosimetry (GEIWIP). In particular embodiments used to experimentally confirm the operability and reliability of the inventive equipment and procedure, argon gas and water were stored in an accumulator that allowed water to fill the pores of the material sample instead of gas. Gas expansion occurred during water intrusion into the porous material. The experimental condition was not required to be necessarily isothermal. Due to the differences between properties of water and gas (e.g. density, viscosity), the variations of pressure occurred slowly, allowing the pressure-time history to be recorded. The pressure versus time data can allow determination of pore size distribution and permeability calculation. In the experimental testing summarized herein, GEIWIP was carried out on four different concrete samples with different porosities ranging from 10 to 20%. As water was a wetting fluid in concrete, it had a tendency to fill the larger pores behind the finer pores, yielding larger porosity measurements comparing to MIP measurements. The validity of the test results was assessed by comparing them with modified gas expansion method (Washburn and Bunting, 1922) and those of MIP and NMR performed on the same concrete samples. A good agreement was seen with modified gas expansion. The better agreement was obtained with NMR results.

In additional experimentation also summarized herein, GEIWIP was also used to generate a reliable pore size distribution of concrete materials from gel pores to macro pores. The intrusion of water was ascribed to its meniscus radius based on the concepts of forced intrusion of a wetting fluid as well as capillary condensation of water. As the water-concrete forms a hydrophilic surface that triggers the interactions between the molecules of water and concrete, water may enter each pore within the matrix. During the intrusion of water, the meniscus of the water-vapour interface conforms to different radii as it migrates from one pore to another pore. Considering that the meniscus radius is the same as the pore radius, the pore sizes within the concrete matrix were achieved. The resultant pore size distribution by this method is denoted herein as GEIWIP-PSD and was compared to available PSD from MIP method.

GEIWIP—Methodology & Apparatus

Four concrete samples were prepared according to mixtures described in Table 1. Results for resistance to different de-icing salt exposures on the same concrete were published by Ghazy and Bassuoni (2018). The main binder (cement paste) was general use (GU) Portland cement, Portland limestone cement (PLC), and fly ash (Class F). A small proportion of carboniferous aggregate was used with natural gravel with the maximum size of 9.5 mm. A well graded river sand was used as fine aggregate in the concrete structure. More details can be found in Ghazy and Bassuoni (2018).

TABLE 1

Proportions of mixtures per cubic meter of concrete (according to (Ghazy and Bassuoni, 2018)).

| Sample ID. | Cement (kg/m$^3$) | Fly Ash (kg/m$^3$) | Nanosilica (kg/m$^3$) | Water (kg/m$^3$) | Coarse Aggregate (kg/m$^3$) | Fine Aggregate (kg/m$^3$) | 28 day Compressive Strength (MPa) |
|---|---|---|---|---|---|---|---|
| GUF20 | 320 | 80 | — | 160 | 1077 | 580 | 38 (0.7) |
| GUF30 | 280 | 120 | — | 160 | 1068 | 575 | 35 (1.1) |
| FLCF30 | 280 | 120 | — | 160 | 1068 | 575 | 40 (0.8) |
| PLCF30S | 256 | 120 | 48 | 136 | 1063 | 573 | 47 (0.3) |

The values between parentheses in the last column are the standard errors.

In the name of the Sample ID, GU or PLC referred to the type of binder, F20 and F30 expressed 20 and 30% fly ash, respectively, and S referred to nanosilica. The material mixing procedures, casting and curing conditions were described in Ghazy and Bassuoni (2018). FIG. 1 shows one dried concrete sample body containing the voids, hardened cement paste, and aggregates.

Referring to FIG. 1, the illustrated embodiment reflects the prototype apparatus used in the experimental testing, and features:

- a regulator connectable to a pressurized cannister containing a pressurized supply of argon;
- a gas/water accumulator;
- a gas intake control valve, for example in the form of a Swagelok® needle valve NV1, installed between the regulator and a gas inlet port of the accumulator tank;
- an evacuation valve, for example in the form of a Swagelok® needle valve NV2, connected between the gas intake control valve NV1 and the gas inlet port of the accumulator tank via a T-fitting;
- a sample vessel defining a sealed internal environment for containing a material sample therein;
- a fluid line connected from a water output port at the bottom of the accumulator tank to a water intake port on the sample vessel;
- an initiation valve, for example in the form of a Swagelok® ball valve BV1, installed in the fluid line between the accumulator tank and the sample vessel;
- a water preloading container, for example in the form of a graduated cylinder, connected to the accumulator tank via a fill line for purpose of accepting measurable volume of water in the pre-loading container, for subsequent loading of said pre-measured water into the accumulator tank;
- a loading valve, for example in the form of a Swagelok® ball valve BV2, installed in the fill line between the preloading container and the accumulator tank;
- a preloader drain valve, for example in the form of a Swagelok® ball valve BV3, installed in the fill line between the preloading container and the loading valve BV2;
- a vessel output valve, for example in the form of a Swagelok® ball valve BV4, coupled to a fluid outlet of the sample vessel by a relief line for the purpose of opening and closing said fluid outlet in order to switch the sealed interior environment of the sample vessel between a fully closed state preventing release of fluid therefrom, and a relief state allowing such release of fluid from the sample vessel via the relief line; and
- a pressure sensor, for example a microgage P-102 pressure transducer PT installed between the regulator and the gas intake control valve NV1, to measure the gas pressure inside the accumulator tank, and connected to a computerized data acquisition system, such as that described below, to log the pressure measurements at regular intervals on an ongoing basis.

In the prototype, the components were assembled on an aluminium plate and were connected to each other through 1/16 in. OD steel pipes defining the various lines mentioned above. A Swagelok® 316L Stainless Steel Double Ended DOT-Compliant Sample Cylinder, 1/4 in. FNPT, 300 cm³, 1800 psig was used as the gas/water accumulator tank. The pressure within the accumulator was recorded throughout each experiment using a microgage P-102 pressure transducer connected to the data acquisition system. The pressure transducer was rated for 0 to 14 MPa with the accuracy of ±0.4 kPa. It was calibrated with a dead-load calibration apparatus. The output of the transducer was connected to a μMAC-5000 analog-to-digital converter. The converter was connected to a data acquisition system in the form of a personal computer running LabTech Notebook version 7.2.1W data-acquisition software. The computer monitor served as a visual display by which data acquisition system displayed the pressure numerically, and graphically as a function of time. The pressures and elapsed time were recorded every second. It will be appreciated that the equipment details of the prototype are for demonstrative purposes only, and are not intended to be limiting examples of the type of equipment from which a comparable apparatus may be assembled. Likewise, the one-second data logging interval is presented only as a non-limiting example, and may be varied.

A calibration test on the forgoing apparatus was performed to understand the behaviour of argon gas within the accumulator during the expansion process. The accumulator was filled partially with 200 ml of distilled de-aired water at ambient pressure and temperature. Then, argon gas was injected into the accumulator to increase the pressure to 200 kPa. At this step, the system of gas/water was in thermodynamic equilibrium. Next, the initiation valve BV1 was opened to induce flow of a specific amount of water from the accumulator into the empty sample vessel. This led the argon gas to expand within the accumulator. Then, the initiation valve BV1 was closed, and the amount of water collected in the sample vessel was measured through a graduated cylinder. During this process, the accumulator pressure was recorded by the data logger, which was connected to the pressure transducer, PT, to get one data point of pressure-volume. Opening and closing the initiation valve BV1 was repeated nine times to get nine data point of pressure-volume. Finally, the calibration results depicted a P-V diagram, showing that the gas volume through time, V(t) [mL] can be related to the pressure through time, P(t) [kPa] by a polytropic process.

$$V(t) = \sqrt[n]{K/P(t)} \tag{B1}$$

where n is the polytropic power index [-] and K is the polytropic constant. Their values were obtained by the best curve fitting method.

Figure 3:
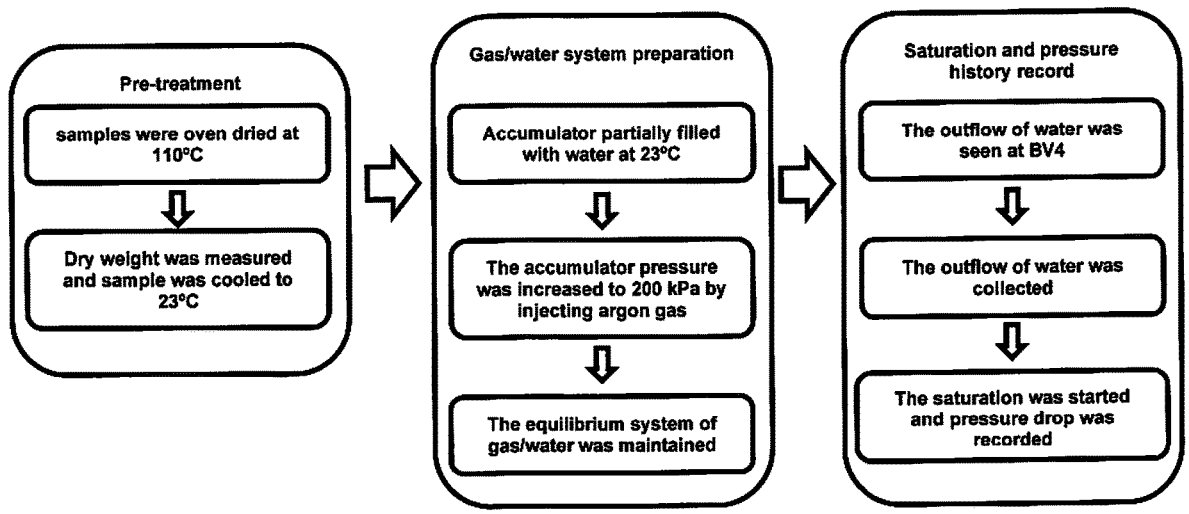
FIG. 3 is a flowchart of an experimental procedure followed on material samples measured in the FIG. 1 apparatus.

The above gas/water intrusion set up (FIG. 1) was designed to implement the GEIWIP measurement. The optimum values of test parameters including sample size, pre-treatment time, volume of water, saturation time, temperature, and initial pressure are summarized in the triple-step flowchart of FIG. 3.

The samples were oven dried at 110° C. for 24 h to minimize the pore moisture. It was assumed that heating the concrete samples up to this temperature induces shrinkage cracks. However, this did not affect the test results as all the samples were heated up to 110° C. few times prior to the main tests and the potential changes of the concrete structure were already taken place. Before placing the samples in the vessel, their dry weight of each sample, $W_d$, was measured and the samples were cooled to room temperature (23° C.) while wrapped with a plastic film to isolate ambient moisture. Then, the plastic film was removed and the sample was placed in the vessel. Similar to the calibration test, the accumulator was partially filled with 200 ml of distilled de-aired water at room temperature and under ambient pressure. This was done by using the U-shape system connected to the accumulator, including the preloading container, the fill line and the ball valves BV2, BV3 installed therein. Once the accumulator was partially filled from the measured quantity of fluid in the preloading container, loading valve BV2 was closed. The remaining 100 ml (unfilled volume) of the accumulator initially accommodated air, to which argon gas was added by opening gas intake valve NV1 with evacuation valve NV2 and initiation valve BV1 closed in order initially pressurize the accumulator tank using the mix of air and argon. Once pressurized, gas intake valve NV1 was closed and evacuation valve NV2 was opened to allow bleeding of the mixture from the, accumulator tank, thus reducing the air content of the accumulator. With evacuation valve NV2 remaining open, gas intake valve NV1 was re-opened again to inject more argon into the tank and thereby evacuate the remaining air from the tank. Once the flow through evacuation valve NV2 was found to be a steady stream of argon gas, thereby confirming the absence of air in the tank, evacuation valve NV2 was closed, followed by closure of gas intake NV1 once a targeted initial tank pressure of 200 kPa was reached. Based on the complementary tests that were done with different initial pressures, higher initial pressures led to overestimation of porosity due to elastic deformation of pores within the concrete solid structure. Lower initial pressures led to longer saturation time. Because the initial conditions of the experimental tests were set to be the same as the calibration test, the same behaviour of gas (i.e. the polytropic function of calibration test) was expected during the experimental test. The initial conditions of calibration test were set as the initial conditions of the experimental tests to simulate the behaviour of argon gas during calibration test. The transducer, which were connected to the data logger, started to record the pressure of the accumulator. After the gas intake control valve NV1 was closed, the system of gas/water was balanced at equilibrium condition under 200 kPa in the accumulator. Next, valves BV4 and BV1 were opened, so that the water could readily flow into and through the vessel, allowing the argon gas to expand within the accumulator. The water flowing through the vessel during this stage acts to force the evacuation of any ambient air from the sealed interior space of the vessel. Once the outflow of water at the relief line was seen to no longer contain air bubbles, thus confirming completion of this initial air evacuation stage, the vessel output valve BV4l was closed. The outflow of water from the relief line of the vessel was collected and the volume was measured by a graduated cylinder for use of this outflow volume in later calculations. After this closure of the vessel output valve BV4, initiation valve BV1 remained open to allow water to continue to enter the interior of the sample vessel, and thus saturate the porous material sample contained therein. This saturation process, throughout which the dropping accumulator pressure was logged and displayed, was carried out until the pressure stabilized, and no further pressure drop was detected, thus denoting an end point of the test at which a final pressure reading was logged. After such end point, the vessel was dismantled and the saturated sample weight in air, $W_s$ was measured.

The whole amount of water that flowed to the vessel at time t, V(t) was equal to the change of volume of argon during the intrusion. According to the calibrated polytropic relation between the pressure and volume, the amount of water could be calculated versus time. Finally, the amount of water that was intruded into the concrete sample, $V_{int}(t)$ was calculated as follows:

$$V_{int}(t) = V(t) - V_{ann} - V_{out} - 100 \quad \text{(B2)}$$

Here, $V_{ann}$ [ml] is the annular volume between the sample and the vessel chamber, i.e. the difference between the bulk volume of the material sample and the volume of the vessel's sealed internal space, thereby denoting an unoccupied empty space of the vessel interior that should not be considered in the porosity measurement calculations. $V_{out}$ [ml] is the outflow volume of water collected from the relief line during the initial flow-through stages in which ambient air is evacuated from the vessel. Considering that the saturation occurred at time T, $V_{int}(T)$ [ml] was used to calculate the porosity. Knowing the bulk volume of any sample, $V_{bulk}$ [ml], the porosity by this method, $\varnothing_{GEIWIP}$ [%] was determined by Eq. (B3).

$$\varnothing_{GEIWIP} = \frac{V_{int}(T)}{V_{bulk}} \times 100 \quad \text{(B3)}$$

Figure 2:
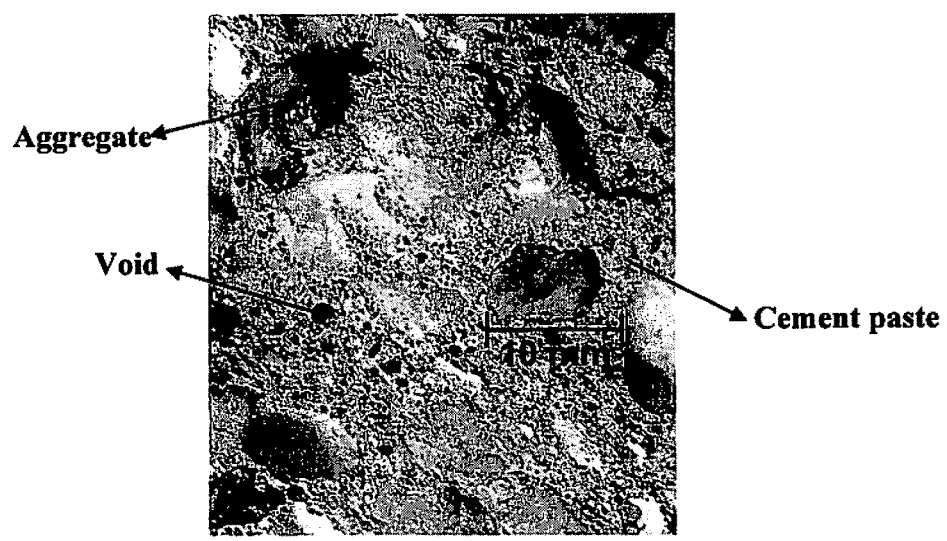
FIG. 2 photographically illustrates a dried concrete sample subjected to porosity measurements in experimental testing the FIG. 1 apparatus.

The porosity measured by GEIWIP represents the pores that were filled with water. This is the total water intruded into the dried concrete sample, filling the voids, the pores within the cement paste, and the pores within the aggregates (see FIG. 2). The three steps of pre-treatment, gas/water system preparation, and saturation were repeated three times (termed Test-1, Test-2, and Test-3) to obtain three pressure-time histories for each sample tested, and evaluate variations between the test results. For each concrete sample with a specific porosity, the saturation time T varies with the saturation pressure $P_S$ and the viscosity μ of the intrusive fluid (i.e. distilled de-aired water) at the intrusion temperature (i.e. 23° C.). It was noted that any changes in room temperature would change the viscosity and in turn would alter the saturation pressure and time for each sample. In order to get an independent parameter of either pressure or temperature, the non-dimensional saturation time T* is defined in Eq. (B4). This parameter was used to compare the saturation time of any sample regardless of saturation pressure or temperature.

$$T^* = P_s \cdot \frac{T}{\mu} \quad \text{(B4)}$$

Furthermore, at the end of the test, the measured weight of the samples at dry and saturated conditions provided another porosity measurement that was calculated by Eq. (B5). Weights were measured in a balanced set-up (Mettler Toledo XSTM, accuracy of 0.01 mg).

$$\varnothing_W = \frac{(W_s - W_d)/\rho_{H_2O}}{V_{bulk}} \quad \text{(B5)}$$

The density of distilled de-aired water, $\rho_{H_2O}$, at room temperature of 23° C. was measured and porosity $\varnothing_W$ was calculated for all samples at each test.

The GEIWIP results were compared with other porosimetry methods, including modified gas expansion, MIP, and NMR techniques. In this study, the same apparatus was utilized for the modified gas expansion method. In the common gas expansion method (Monicard, 1980), the process of expansion of gas was isothermal and grain volume was calculated from Boyle's law (Monicard, 1980). However, in the modified gas expansion test, the expansion process was not necessarily isothermal. Similar to the GEI- WIP method, a polytropic process was the governing process during the gas expansion. Therefore, prior to the main test, a calibration test was required to determine the polytropic index and polytropic constant. After determination of the polytropic equation, the main test was carried out. The accumulator (FIG. 1) was filled with argon gas to the initial pressure $P_i$, while it was connected to the vessel, encompassing the sample, through the closed valve BV1. The vessel was at ambient pressure. Three tests were carried out for each sample at different initial pressures of the accumulator ranging from 83-92 kPa. Once the BV1 was opened, the equilibrium pressure $P_e$ was measured by a pressure transducer PT. Then, knowing the polytropic index n, the grain volume $V_{grain}$, was calculated from Eq. (B6).

$$V_{grain} = \left(1 - \sqrt[n]{\frac{P_i}{P_e}}\right) V_i + V_{vessel} \tag{B6}$$

where $V_i$ and $V_{vessel}$ are initial and vessel volume, respectively. As a result, the porosity from the modified gas expansion method $\emptyset_{GE}$ of the sample was calculated as follows:

$$\emptyset_{GE} = \left(1 - \frac{V_{grain}}{V_{bulk}}\right) \times 100 \tag{B7}$$

In addition, the GEIWIP results were compared with MIP results. MIP tests were carried out on a similar concrete samples. However, the size of each sample had a maximum 5 mm diameter and only the mortar part of the concrete (excluding coarse aggregates) was placed in the MIP apparatus due to its spatial limitation. The details of the MIP tests on these concrete samples can be found in Ghazy and Bassuoni (2018).

Additionally, NMR was carried out on exactly similar concrete samples. In this test, the relaxation behaviour of magnetically excited water in the concrete sample was investigated. In the presence of a magnetic field gradient, water was allowed to diffuse into the concrete sample by its weight and under ambient pressure. The transverse dephasing pulse, known as $T_2$ relaxation time (ms), was recorded while the sample was saturating. The $T_2$ relaxation time was measured with an interecho spacing of 0.1 ms and a minimum signal to noise ratio (SNR) of 100:1, using an Oxford Maran DRX-HF instrument at 30° C. and 2 MHz frequency coupled with GITSystems software. $T_2$ distribution curves obtained by the software at 100% saturation were used to calculate the pore volume and porosity.

GEIWIP—Results

Figure 4:
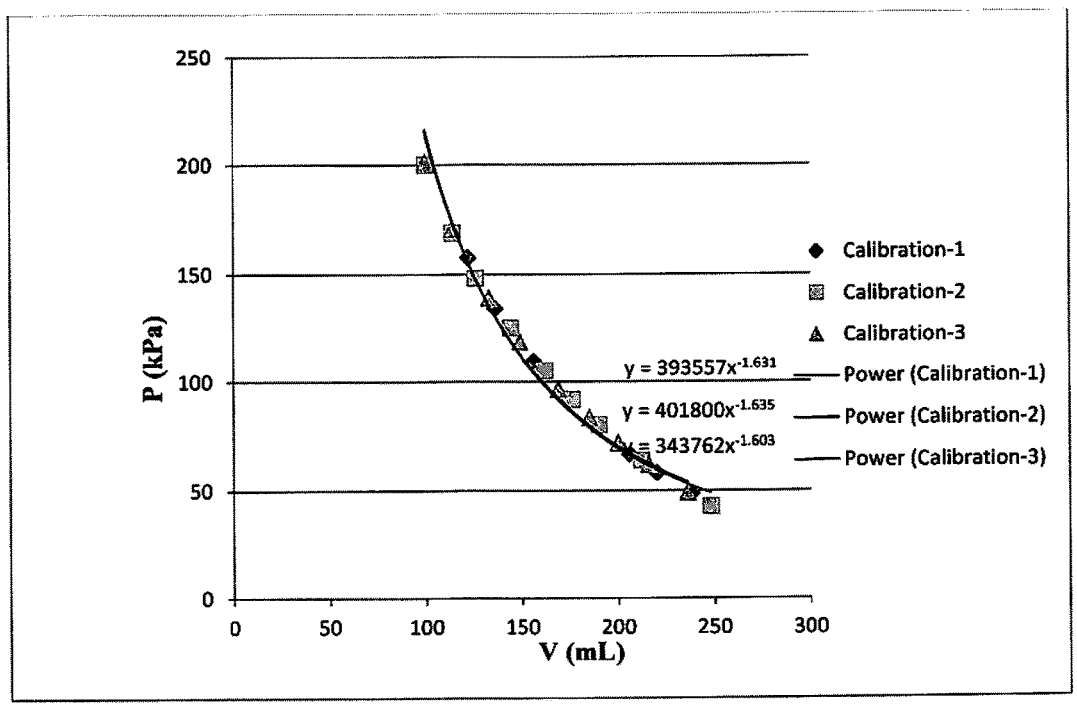
FIG. 4 plots data points from calibration tests performed with the FIG. 1 apparatus prior to the porosity measurements, starting at initial state (200 kPa, 100 ml) and shows corresponding power law function curve fittings of the data points.

To calibrate the polytropic process of argon gas at the initial state (i.e. 200 kPa pressure, temperature of 23° C., and volume of 100 ml, nine data points were recorded. The resulting curves are presented in FIG. 4. The data points were obtained two times (i.e. before and after the test). The best curve fitting of power law function to each set of data points was obtained and depicted with solid black and dashed red lines as Power (calibration-1 and -2) in the P-V diagram given in FIG. 4.

The calibration tests showed that argon gas within the accumulator was going through a polytropic process, termed the "GEIWIP pressure-volume relationship". Two curve fittings resulted in a polytropic index of 1.63, and two different constants presented in FIG. 4. The absolute average error for the power law curve of Calibration-1 was −2.2% and for the power law curve of Calibration-2 was 7.5%, hence, the function for Calibration-1 was considered as the GEIWIP pressure-volume relationship.

The constant with less cumulative error percentage was selected to form the GEIWIP relationship as shown in Eq. (B8).

$$V(t) = \sqrt[1.63]{393,557/P(t)} \tag{B8}$$

Pressure-time data points were recorded until no pressure reduction was noted, which was considered as the saturated condition for each sample. FIGS. 5a-5d show the pressure-time plots including the first 50 seconds, and from 50 seconds to 20 hours (smaller plots) for sample GUF20, GUF30, PLCF30 and PLCF30S, respectively. The GEIWIP test was repeated three times on the same samples and the corresponding pressure-time data points are depicted with black circles for Test-1, red triangles for Test-2, and blue crosses for Test-3, in FIG. 5.

Figure 5:
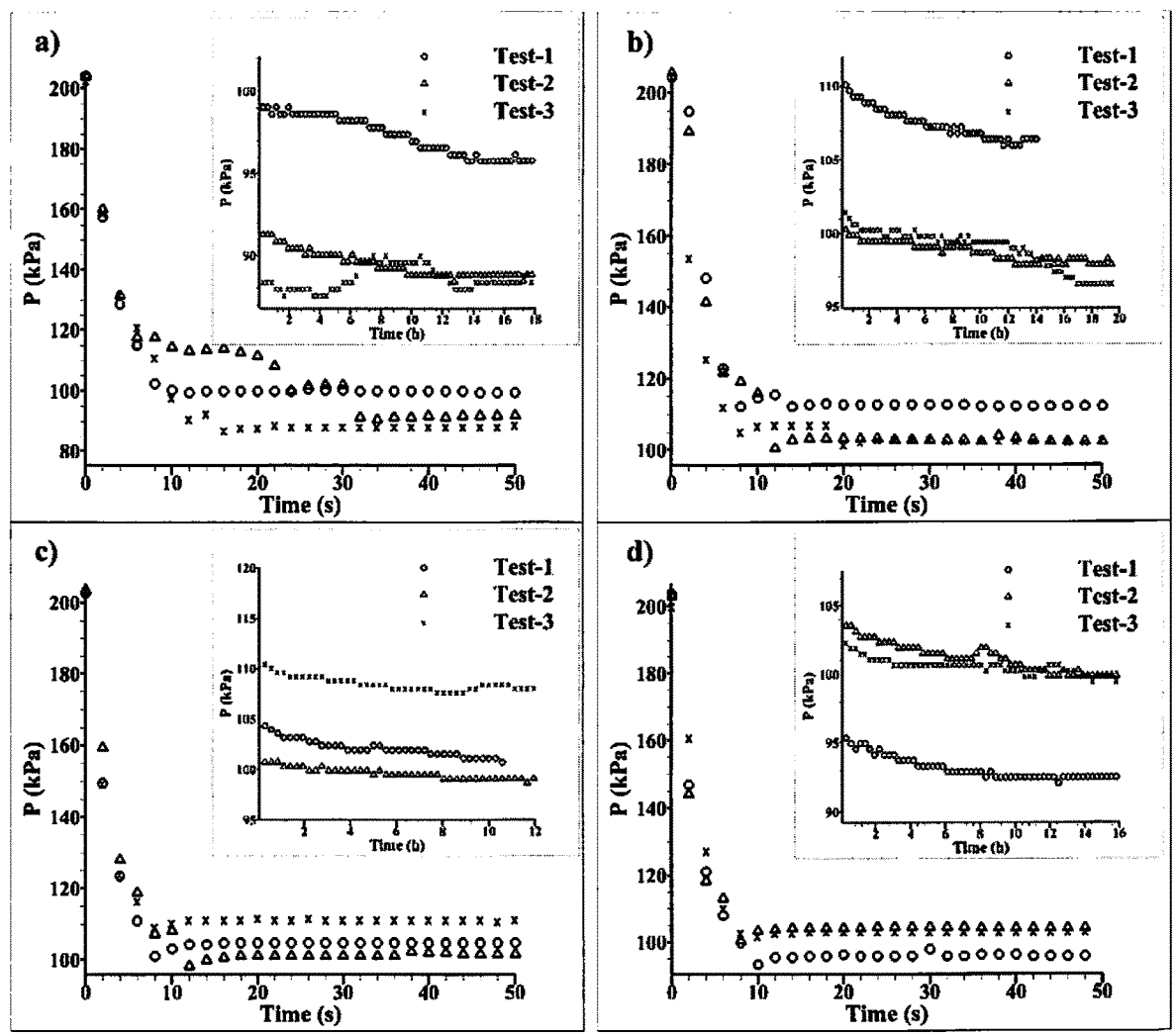
FIG. 5 shows pressure-time plot for different material samples a) GUF20, b) GUF30, c) PLCF30, and d) PLCF30S subjected to porosity measurements within the apparatus of FIG. 1.
Figure 6:
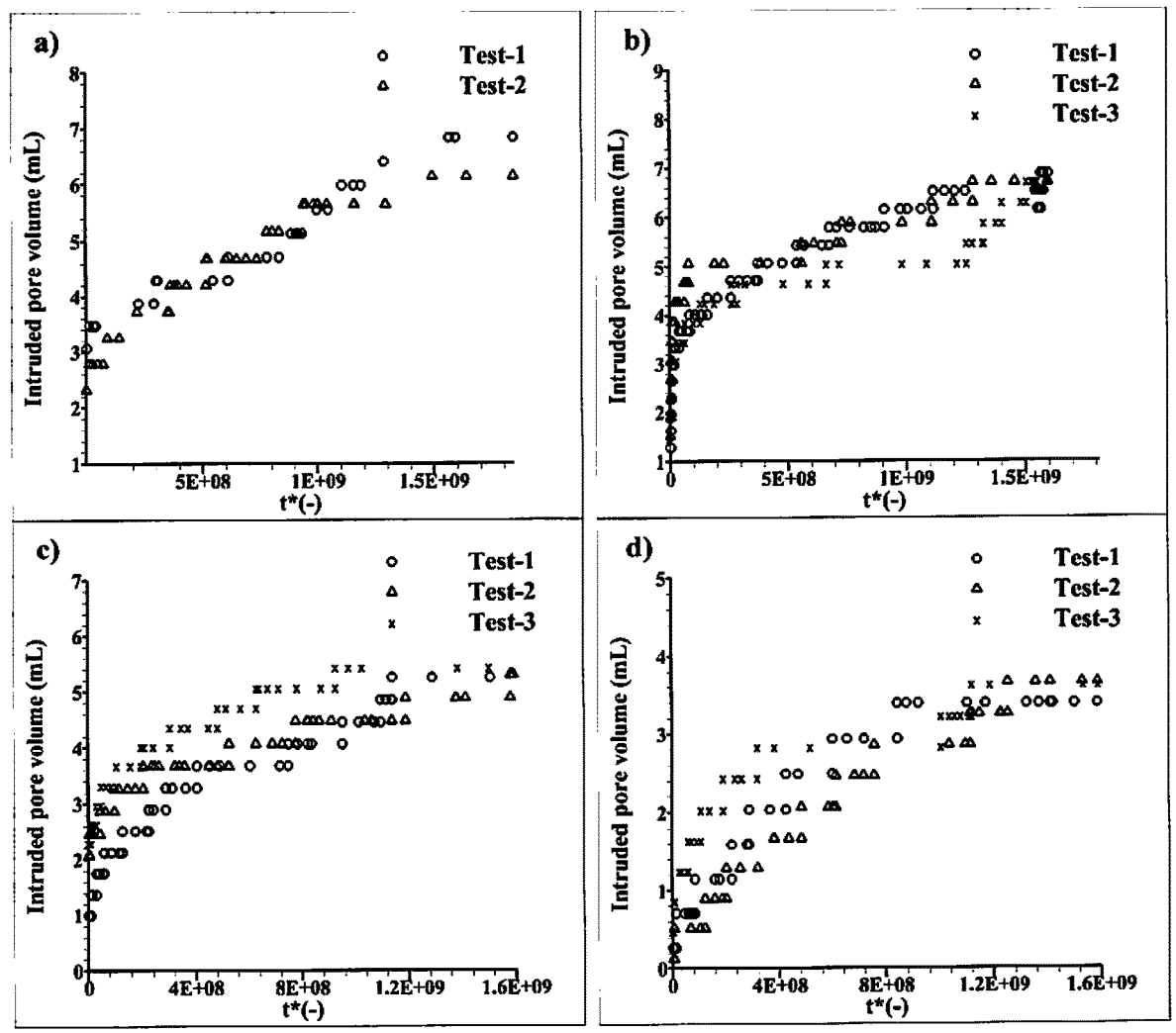
FIG. 6 shows intruded pore volume data points from the porosity measurements performed on the material samples: a) GUF20, b) GUF30, c) PLCF30, and d) PLCF30S.

FIG. 5 shows that the pressure of argon gas within the accumulator dropped from the initial state of 200 kPa due to the flow of distilled de-aired water to the vessel. The water filled the annular volume of the vessel around the concrete sample, and the pores of the concrete sample itself. Different pressure drops were obtained for Tests 1 to 3, in which different outflows of water were collected. For example, in FIG. 5a, the outflow of water taken for Test-1, was 30 ml, while for Test-2 and Test-3 the values were 39 and 42 ml, respectively. Therefore, Test-2 and Test-3 show more pressure drop than Test-1 for the first 50 seconds of the experiment. The amount of collected outflow of water in each test was used to calculate the intruded volume, which is the pore volume filled with water. The experiment continued until the time that the pressure remained constant, noted as saturated pressure $P_S$, and saturated time T (FIG. 5). The saturated pressure-time of Test-1 was 95.8 kPa after 15 h. For Test-2 and Test-3, the saturated pressure-times were 88.8 kPa after 14 h and 88.4 kPa after 14 h, respectively (FIG. 5a). Similarly, in FIG. 5b, the outflow of water taken at Test-1 was 20 ml, while at Test-2 and Test-3, it was 28 ml, equally. Therefore, Test-2 and Test-3 showed more pressure drop than Test-1 for the first 50 seconds of the experiment. The experiment continued until the saturated state. The saturated pressure-time of Test-1 was 106.4 kPa after 14 h. For Test-2 and Test-3, the saturated pressure-times were 97.8 kPa after 19 h and 96.5 kPa after 19 h, respectively. Finally, pressure-time data points were substituted into Eq. (B8). The annular volume, $V_{ann}$ between the sample and the vessel was measured. The annular volume for sample GUF20, GUF30, PLCF30, and PLCF30S is 28 ml, 28 ml, 29 ml, and 33 ml, respectively. Then, Eq. (B2) was used to obtain intruded volume $V_{int}$. The intruded volume was plotted versus non-dimensional time t*. It is indicated that for each sample, non-dimensional saturation time t* was equal in Test-1 to 3. For example, in FIG. 6a, the saturation was obtained at t*=1.49×10$^9$ in Test-1 and 2 of sample GUF20. For sample GUF30 (FIG. 6b), saturation was seen at t*=1.50×10$^9$. For samples PLCF30 (FIG. 6c) and PLCF30S (FIGS. 6c and 6d), saturation was obtained at t*=1.57×10$^9$ and t*=1.60×10$^9$, respectively. As t* was shown to be independent of test conditions such as initial pressure, or outflow volume, it can be inferred that t* is an intrinsic property of each sample, showing how fast a sample is saturated. The higher pore volume, the larger the non-dimensional saturation time determined in the GEIWIP test. The pore volume of each sample was taken from the maximum intruded pore volume (FIG. 6).

The bulk volume was obtained from direct mathematical calculation of a cylinder volume, as the samples each had a cylindrical shape. The outflow volume of water, $V_{out}$ was collected to remove the air bubbles from the vessel. Comparison between Test-1, Test-2, and Test-3 showed consistent porosity values $Ø_{GEIWIP}$ (Table 2). Additionally, the porosity based on Eq. (B5) was calculated and compared with those of the GEIWIP method. Density of distilled de-aired water $\rho_{H_2O}$ at room temperature before and after the test was measured to be 0.995 and 0.992 g/cm$^3$, respectively. The change in density was observed due to the dissolution of gas into the water, thus, water was expanded 0.3% of its initial state, at the end of the experiment. The mean value of density 0.9935 g/cm$^3$ was substituted in Eq. (B5) to calculate the porosity. Comparison between Test-1, Test-2, and Test-3 shows consistent porosity values.

TABLE 2

GEIWIP test parameters and porosity measurement results.

| Sample ID. | $V_{bulk}$ (mL) | Test # | $V_{out}$ (mL) | $V_{pore}$ (mL) | $Ø_{GEIWIP}$ (%) | $\overline{Ø}_{GEIWIP}$ (%) | S | $W_d$ (g) | $W_s$ (g) | $Ø_w$ | $\overline{Ø}_w$ |
|---|---|---|---|---|---|---|---|---|---|---|---|
| GUF20 | 38 | 1 | 30 | 6.84 | 18.0 | 18.4 | 0.56 | 77.43 | 84.37 | 18.4 | 18.3 |
|  |  | 2 | 39 | 7.14 | 18.8 |  |  | 77.43 | 84.34 | 18.3 |  |
|  |  | 3 | 42 | — | — |  |  | 77.36 | 84.26 | 18.3 |  |
| GUF30 | 38 | 1 | 20 | 6.88 | 18.1 | 17.8 | 0.23 | 78.57 | 84.02 | 14.4 | 14.4 |
|  |  | 2 | 28 | 6.71 | 17.7 |  |  | 78.57 | 84.00 | 14.4 |  |
|  |  | 3 | 28 | 6.71 | 17.7 |  |  | 78.64 | 84.04 | 14.3 |  |
| PLCF30 | 37 | 1 | 26 | 5.26 | 14.2 | 14.4 | 0.26 | 81.25 | 85.81 | 12.4 | 12.4 |
|  |  | 2 | 28 | 5.30 | 14.3 |  |  | 81.25 | 85.84 | 12.5 |  |
|  |  | 3 | 19 | 5.44 | 14.7 |  |  | 81.36 | 85.89 | 12.3 |  |
| PLCF30S | 33 | 1 | 32 | 3.39 | 10.3 | 10.8 | 0.44 | 72.60 | 76.09 | 10.6 | 10.4 |
|  |  | 2 | 24 | 3.66 | 11.1 |  |  | 72.66 | 76.03 | 10.3 |  |
|  |  | 3 | 24 | 3.63 | 11.0 |  |  | 72.65 | 76.03 | 10.3 |  |

The mean value of porosities obtained from the three tests for each sample were denoted as $\overline{Ø}_{GEIWIP}$ and $\overline{Ø}_w$. The comparison showed good agreements for samples with a maximum difference of 3.4%. The standard deviation of porosity values, S, of each sample varied between 0.23 to 0.56. In these samples, the GEIWIP porosities were consistently higher than those obtained by weight measurements. The differences observed in $\overline{Ø}_{GEIWIP}$ and $\overline{Ø}_w$, may be due to the differences in their operating pressure. In the GEIWIP test, the operating pressure was 200 kPa and the pores on the surface of the concrete were fully filled. On the other hand, at the end of the test, the vessel was dismantled and the sample was exposed to the ambient environment. While carrying the sample from the vessel to the balance set-up, the pores on the concrete surface may lose their water content and remain only partially filled. Therefore, the saturated weight measured at ambient pressure may not account for the amount of water that was lost from the surface pores.

The GEIWIP results were compared with the results obtained from modified gas expansion (GE) technique. The measurements were done on exactly the same concrete samples. The vessel volume was measured to be 66 ml.

TABLE 3

Calibration test prior to modified GE test.

| Test # | $P_i$ (kPa) | $P_e$ (kPa) | $P_i/P_e$ | n |
|---|---|---|---|---|
| 1 | 51.18 | 41.77 | 1.22 | 1 |
| 2 | 101.93 | 83.51 | 1.22 |  |
| 3 | 150.64 | 123.62 | 1.22 |  |
| 4 | 201.38 | 164.96 | 1.22 |  |
| 5 | 300.84 | 246.40 | 1.22 |  |
| 6 | 400.00 | 327.44 | 1.22 |  |

It was noticed that the pressure ratio, $P_i/P_e$ in all tests 1-6 is constant (Table 3). According to Eq. (B6), when the vessel is empty, the grain volume is zero so that the pressure ratio must be proportional to the volume ratio $V_{vessel}/V_i$. As the volume ratio was the same (i.e. 0.22) in all tests 1-6, the resultant pressure ratio was constant. Each test was completed in 5 minutes. Finally, a polytropic index of 1 was obtained from solving Eq. (B6). The polytropic index of unity stands for an isothermal process. Therefore, Boyle's law was valid for the modified gas expansion test.

Once the behaviour of gas was recognized to be isothermal, the modified GE experiment was started. The operating pressure was in the range of 83 to 92 kPa in Test-1, Test-2, and Test-3. This range of pressure was selected to have a similar saturation condition as the GEIWIP test. The mean value of three porosities was calculated and reported as $\overline{Ø}_{GE}$ (Table 4). The mean porosity of each sample was compared with the GEIWIP mean porosity $\overline{Ø}_{GEIWIP}$. The comparison shows that $Ø_{GE}$ was in good agreement with $\overline{Ø}_{GEIWIP}$. This was because of the water in the GEIWIP test, which is a wetting fluid, tending to penetrate from larger pores to smaller pores due to capillary forces. In the GEIWIP test, the capillary forces within the pores are toward the flow of water intrusion. Therefore, in smaller pores, where capillary forces are larger, the water may continue to flow and fill the pores. On the other hand, in the modified GE test, argon gas is a non-wetting fluid and the capillary forces are against the flow and oppose the intrusion of gas. In pore throats, capillary forces are large enough to prevent the gas from filling the pores. However, argon gas had lower viscosity compared to water in GEIWIP test. The low viscosity feature of gas overcame the capillary forces and penetrated to pore throats and provided the same porosity as GEIWIP porosity.

TABLE 4

Results of modified GE and their comparison with GEIWIP porosity.

| Sample ID | Test # | $P_t$ (kPa) | $P_e$ (kPa) | $P_t/P_e$ | $V_{grain}$ (mL) | Porosity, $\emptyset_{GE}$ | S | $\overline{\emptyset}_{GE}$ | $\overline{\emptyset}_{GEIWIP}$ |
|---|---|---|---|---|---|---|---|---|---|
| GUF20 | 1 | 87.16 | 78.16 | 1.115 | 31.45 | 17.2 | 1.07 | 18.1 | 18.4 |
|  | 2 | 89.20 | 79.80 | 1.118 | 30.66 | 19.3 |  |  |  |
|  | 3 | 90.84 | 81.43 | 1.116 | 31.20 | 17.9 |  |  |  |
| GUF30 | 1 | 83.47 | 74.88 | 1.115 | 31.50 | 17.1 | 0.80 | 17.9 | 17.8 |
|  | 2 | 86.34 | 77.34 | 1.116 | 31.20 | 17.9 |  |  |  |
|  | 3 | 90.02 | 80.61 | 1.117 | 30.90 | 18.7 |  |  |  |
| PLCF30 | 1 | 87.16 | 78.15 | 1.115 | 31.50 | 14.9 | 0.52 | 14.6 | 14.4 |
|  | 2 | 90.88 | 81.43 | 1.115 | 31.50 | 14.9 |  |  |  |
|  | 3 | 91.66 | 82.24 | 1.114 | 31.80 | 14.0 |  |  |  |
| PLCF30S | 1 | 88.38 | 78.96 | 1.119 | 30.30 | 8.1 | 2.75 | 10.9 | 10.8 |
|  | 2 | 86.07 | 76.93 | 1.122 | 29.40 | 10.9 |  |  |  |
|  | 3 | 92.07 | 81.84 | 1.125 | 28.50 | 13.6 |  |  |  |

Figure 7:
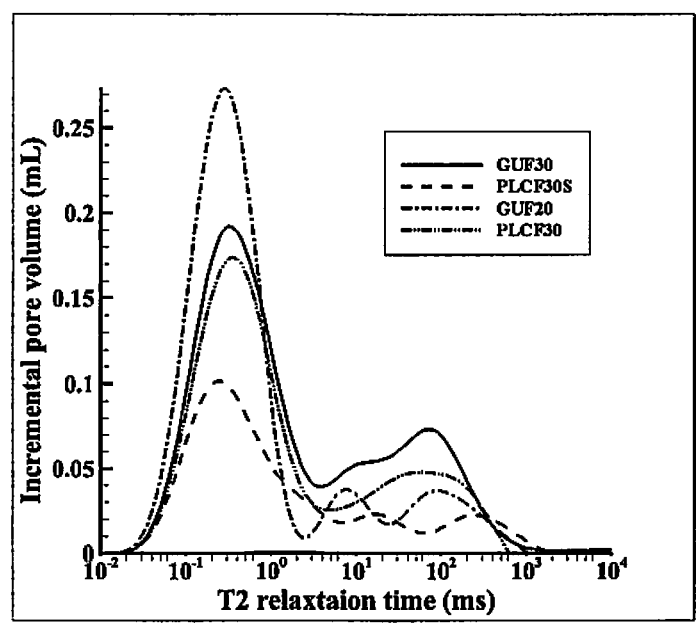
FIG. 7 shows relaxation time ($T_2$) distribution curves at 100% saturation in NMR for samples GUF20, GUF30, PLCF30, and PLCF30S.

In the NMR tests, the $T_2$ relaxation time was measured. The $T_2$ distribution curve (FIG. 7) was used to calculate the summation of all incremental volumes, considered as the cumulative pore volume.

Subsequently, the mean GEIWIP porosity of each sample was compared with the porosity obtained from NMR, $\emptyset_{NMR}$ and presented in Table 5.

TABLE 5

Results of NMR test and its comparison with GEIWIP porosity.

| Sample ID | NMR cumulative pore volume (mL) | $\emptyset_{NMR}$ | GEIWIP Mean pore volume (mL) | $\emptyset_{GEIWIP}$ |
|---|---|---|---|---|
| GUF20 | 6.48 | 17.0 | 6.99 | 18.4 |
| GUF30 | 6.68 | 17.6 | 6.77 | 17.8 |
| PLCF30 | 5.43 | 14.7 | 5.33 | 14.4 |
| PLCF30S | 3.31 | 10.0 | 3.56 | 10.8 |

A good agreement was seen between the NMR and GEIWIP porosity values. This confirms that the samples during the GEIWIP test were fully saturated. The differences of $\overline{\emptyset}_{GEIWIP}$ and $\emptyset_{NMR}$ ranged between 1 to 8%.

Finally, MIP tests on the concrete samples with the same type of binders were conducted to determine the apparent porosity. The results were reported in Ghazy and Bassuoni (2018) and are summarized in Table 6.

TABLE 6

Results of MIP test and its comparison with modified GE and GEIWIP porosity.

| Sample ID | $\emptyset_{MIP}$ (Ghazy and Bassuoni, 2018) | $\emptyset_{NMR}$ | $\overline{\emptyset}_{GE}$ | $\overline{\emptyset}_{GEIWIP}$ |
|---|---|---|---|---|
| GUF20 | 15.6 | 17.0 | 18.1 | 18.4 |
| GUF30 | 16.2 | 17.6 | 17.9 | 17.8 |
| PLCF30 | 13.1 | 14.7 | 14.6 | 14.4 |
| PLCF30S | 7.2 | 10.0 | 10.9 | 10.8 |

The MIP results show 9-33% lower porosities comparing to NMR and GEIWIP results. MIP porosities were reported as the apparent porosity, representing only the pore volume, which was inter-connected to each other and to the surface of the concrete cores. However, in the NMR and the GEIWIP tests, water, a wetting fluid, intruded beyond the pore throat. This led to higher porosities by the NMR and the GEIWIP tests compared to the MIP porosity. In addition, the higher GEIWIP porosities can be explained by capillary forces. In the GEIWIP test, the capillary forces within the pores are toward the flow of water intrusion. Therefore, in smaller pores, where capillary forces are larger, the water may continue to flow and fill the pores. In the MIP test, the capillary forces are against the flow and oppose the intrusion of mercury. In smaller pores, capillary forces are large enough to prevent the mercury from filling the pores. Hence, the GEIWIP porosity represents the volume of all pores and the concrete samples were saturated within 20 hours, while the MIP porosity includes only inter-connected pores volume.

The interface between gas/water within the accumulator was circular and stable in shape, during the intrusion in the GEIWIP test. The pressure of the gas on the gas/water interface provided enough force for water to get intruded into the pores of the sample. During the intrusion of water, the level of gas/water interface lowered and caused a larger volume of argon gas. The expansion of argon led to a decrease in the pressure. The amount of pressure drop was related to the amount of volume of water which was intruded into the pores. The increase in volume until a certain maximum value was the indicator of the pore volume intruded until the saturation. Furthermore, a saturation time and saturation pressure were recorded when no more decrease in pressure was investigated. Using the saturation pressure and time, a non-dimensional time was defined to evaluate how fast a sample can get saturated. This parameter was independent of test conditions. The uncertainty of the results was obtained by doing multiple tests (three tests in this study) on the same samples. The standard deviations of porosities for each sample were calculated to show the robustness of the test. The accuracy of the experiments was evaluated through the comparison with modified gas expansion, NMR, and MIP tests. The modified gas expansion was performed using the same apparatus without water. The resultant porosities were in a good agreement with NMR porosities. The evidenced results of GEIWIP and modified GE, which was done by the gas/water intrusion apparatus, corroborated that this apparatus is useful to provide porosity, within an acceptable range of accuracy. The costs and duration of each run are significantly low, comparing to NMR and MIP tests. The GEIWIP with higher accuracy can attain in an environment with thoroughly constant and low temperature (4° C.). It is recommended to place the apparatus in a fridge room, during the test to minimize the evaporation of water in the accumulator. Furthermore, the non-dimensional time is a parameter that can be used to describe the sample's intrinsic permeability as a result of GEIWIP test.

In summary of the GEIWIP experimentation, four concrete cores with different binder types were used as test samples. The gas/water intrusion apparatus provided a simple procedure based on the thermodynamic behaviour of the gas (argon), stored in the accumulator at a certain pressure (200 kPa), to study the pore volume of the samples. The size of the sample was a good representative of the whole concrete including all the geometrical features such as voids, aggregates, and cement paste. The robustness of the GEIWIP test was confirmed according to the standard deviations of each sample. The comparison of the results to other porosimetry methods showed the reliability of the test. It can be concluded that the GEIWIP test provided access to the finer pores and the large pores beyond the narrow throats as the porosities were larger than the porosities obtained from MIP tests. One notable advantage of the GEIWIP is that it provides the pressure reduction history that shows the ability of water to intrude the pores. The trend of the intruded pores volume versus time can be used to measure the permeability of each sample. From the general results, it can be inferred that the GEIWIP test eliminated the limitation of the sample size and produced access to the all interconnected pores. The same accuracy as the NMR test was investigated in the results of the GEIWIP for the lower cost and easy and safe implementation steps. The initial pressure to inject water into the sample can be increased, until no deformations occur within the sample structure, to minimize the saturation time. Thus, the GEIWIP test can be done between 1 to 24 hours to get the porosity of the core samples in the field.

GEIWIP-PSD—Methodology & Apparatus

In relation to measurement of pore size distribution, the same apparatus and testing procedure described above are employed, so that the intruded volume can once again be calculated as:

$$V_{int}(t) = V(t) - V_{ann} - V_{out} - 100 \quad (A4)$$

To parametrize the polytropic process of argon gas at the initial state (i.e. 200 kPa pressure, temperature of 23° C., and volume of 100 mL, nine data points were recorded. The resulting curves are presented in FIG. 4. The data points were obtained twice (i.e. before and after the test). The best curve fitting of the power law function to each set of data points was obtained and is depicted with solid and dashed lines in the P-V diagram given in FIG. 4.

Figure 8:
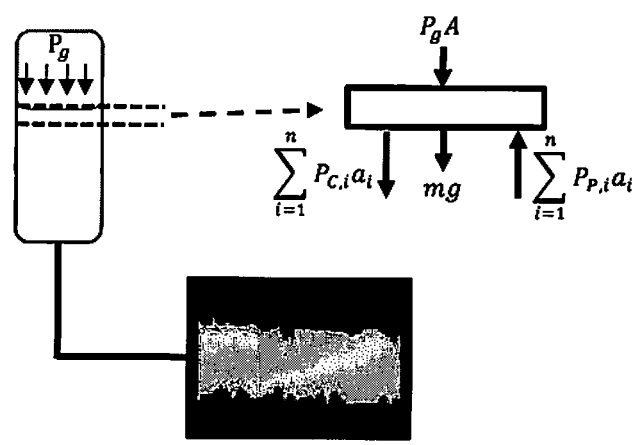
FIG. 8 plots data points from additional calibration tests performed with the FIG. 1 apparatus in preparation for pore size distribution testing of material samples.

The calibration tests showed that argon gas within the accumulator was going through a polytropic process, termed the "GEIWIP pressure-volume relationship". Three curve fittings resulted in a polytropic index between 1.60 and 1.63 and three different constants are presented in FIG. 8. The absolute average error for the power law curve of Calibration-1 was −2.2%, for the power law curve of Calibration-2 was 7.5%, and for the power law curve of Calibration-3 was 8.0%. Hence, the function for Calibration-1 was considered as the GEIWIP pressure-volume relationship. The constant with less cumulative error was selected to form the GEIWIP relationship as follows:

$$V(t) = \sqrt[1.63]{393{,}557/P(t)} \quad (A5)$$

Chemical potential is the energy that is transferred in a phase transition during condensation and evaporation (Atkins and Paula, 2010). At the water-vapour interface within the pores of the concrete matrix, the water will evaporate if the chemical potential of water is greater than the vapour. The vapour can intrude into the connected dry pores, due to lower viscosity. This will increase the chemical potential of vapour in dry pores and condensation occurs, consequently, until the chemical potential of each phase equilibrates.

Knowing that the chemical potential of vapour under saturation vapour pressure is 0, chemical potential of vapour, $\mu_v$ (J/Kg) at vapour pressure is defined as (Gong et al., 2014):

$$\mu_v = RT \ln \frac{P_v}{P_S} \quad (A6)$$

where R is the molar gas constant and equals to $$461.89 \frac{J}{kg \cdot K}$$

and T the absolute temperature. Under environmental condition and at the free surface of water, the relative humidity $$\frac{P_v}{P_S}$$

is less than one, thus me chemical potential of vapour is always negative. This explains the evaporation of water at its free surface as the negative chemical potential of the vapour tends to get closer to zero (Gong et al., 2014).

However, based on experiments (Daian, 1988; Giarma, 2010; Matsumoto and Ogura, 1995; Xi et al., 1994) made on the water migration in concrete and cement-based materials, the behaviour of water in their porous structure is different than free water as the chemical potential of water is not even throughout the pore structure. The chemical potential of water in local positions within the concrete was primarily influenced by the pore size (Gong et al., 2014). Furthermore, it was claimed that water in finer pores has lower chemical potential so that the flow of water occurs from larger pores with higher chemical potential to the finer pores via condensation (Coussy, 2011).

It can be concluded that the chemical potential of water defines the direction of flow of water throughout the pore structure. The chemical potential of water was related to the pore pressure by Gibbs-Duhem equation (Scherer, 2005). At constant temperature, the Gibbs-Duhem equation can be simplified as follows:

$$\frac{d\mu_w}{dr} = 0.001 \frac{dP_P}{dr} \quad (A7)$$

where $$\frac{dP_P}{dr} \left( \frac{Pa}{m} \right)$$

is the derivation of pore pressure with respect to pore radius. Coussy (2011) provided the pressure balance of an unsaturated pore in a porous material under external pressure of $P_e$ (kPa) as follows:

$$P_e = P_P - P_C \quad (A8)$$

where $P_C$ (kPa) is the capillary pressure and can be written as (Scherer, 2005):

$$P_C = \frac{2\sigma\cos\theta}{r-\delta} \tag{A9}$$

Here, δ (nm) is the thickness of the water film due to the capillary condensation. As the external pressure remains constant in all pores, it can be concluded that the integration of pore pressure and capillary pressure (eq. A8) is constant throughout the entire pores. Therefore, the pore pressure in finer pores is smaller than the larger pores, due to the larger capillary pressure in finer pores. As a result, water flows from larger pores to the finer pores (i.e. positive pore pressure gradient). This is in agreement when the direction of flow of water was explained with the chemical potential of water. Accordingly, chemical potential of water can be related to pore radius as follows:

$$\frac{d\mu_w}{dr} = 0.001\frac{dP_C}{dr} = -0.001\frac{2\sigma\cos\theta}{(r-\delta)^2} \tag{A10}$$

By making an integral over eq. A8, chemical potential of water can be obtained.

$$\mu_w(r) = -0.001\frac{2\sigma\cos\theta}{r-\delta} = -0.001 P_C(r) \tag{A11}$$

In fine pores (1-100 nm), the capillary condensation and evaporation rate are in equilibrium during the intrusion of water, yielding to a constant thickness of adsorbed film of water of 0.9 nm (Brun et al., 1977). Knowing that the surface tension of water a is equal to 720 N/cm² at room temperature (23° C.), and equal chemical potential of vapour and water at each pore (eqs. A6 and A11), the relation between the relative humidity and pore size is as follows:

$$\frac{P_v}{P_s} = e^{\left(1.44\frac{\cos\theta}{r_0-0.9}\cdot\frac{1}{RT}\right)} \tag{A12}$$

Eq. A12 gives the exponential relationship between the humidity and pore size distribution at a constant temperature. This relation is only valid for pores up to 100 nm as the humidity in larger pores remains constant at its maximum value.

In the GEIWIP test, the gas pressure (i.e. the pressure in the accumulator) acts as an external pressure that is evenly transferred to the pores. Here, the free forces diagram (FIG. 8) is shown for the element of water that was stored in the accumulator and intruded into the pores.

$$P_g A + mg + \sum_{i=1}^{n} P_{C,i} a_i - \sum_{i=1}^{n} P_{P,i} a_i = m\frac{dz}{dt} \tag{A13}$$

where A (m²) is the surface area of water-gas interface within the accumulator, $P_{c,i}$ (Pa) the capillary pressure at pore i, $P_{P,i}$ (Pa) the pore pressure at pore i, $\alpha_i$ (m²) the water-vapour interface surface area within pore i, and n is the total number of pores that were intruded with m (kg) of water. The left-hand side is the force due to the acceleration of water drop $$\frac{dz}{dt}\left(\frac{m}{s^2}\right)$$

within the accumulator.

Figure 9:
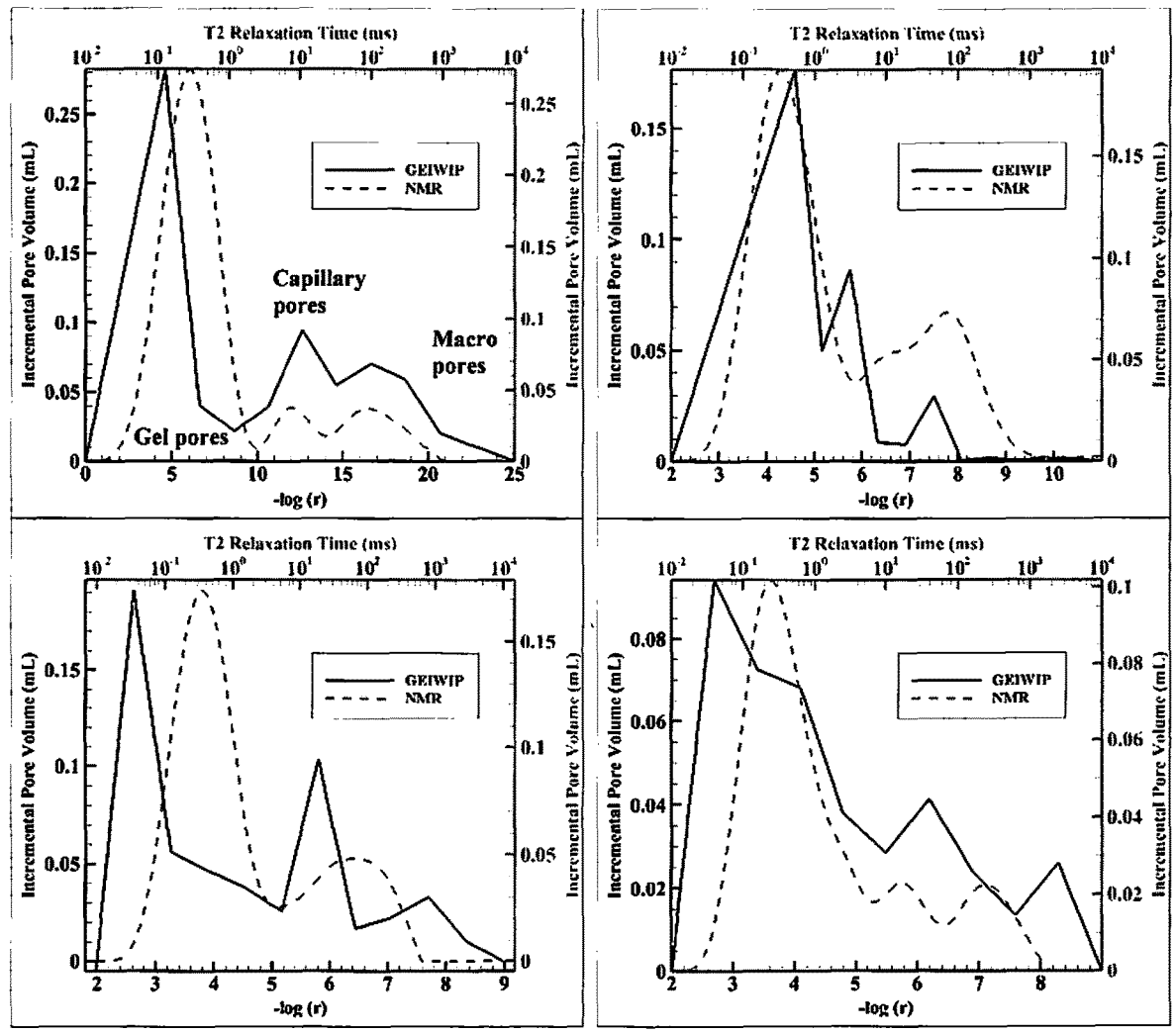
FIG. 9 is a schematic representation of the apparatus of FIG. 1, showing a free force diagram on water stored in the accumulator during the saturating process.

It was assumed that meniscus of water-vapour is a circle with the radius equal to the radius of the corresponding pore. Knowing that the external pressure (eq. A8) is gas pressure in the GEIWIP experiment, the force balance equation for all pores with the radius r can be re-written:

$$P_g A + \rho g V - \pi(P_C - P_g)nr^2 = \frac{\rho V}{A}\frac{dV}{dt} \tag{A14}$$

where $$\rho\left(\frac{\text{kg}}{\text{m}^3}\right)$$

is the density of water, $$g\left(\frac{m}{s^2}\right)$$

is the gravity, and V (m³) is the volume of water that was intruded into the pores i=1,n (eq. A4). Eq. A14 is valid for any time interval during the saturating process until full saturation of the sample. It can be considered that at a specific time interval, the amount of water that was intruded (i.e. intrusion interval) fills the pores with the same size. Considering that the number of pores with the radius r that got filled at each interval is n=β², the GEIWIP-PSD function can be derived:

$$GEIWIP-PSD(r,V): \beta r = \frac{1}{\sqrt{\frac{P_g A}{\pi(P_C-P_g)} + \frac{\rho g}{\pi}\frac{V}{(P_C-P_g)} - \frac{\rho V}{\pi(P_C-P_g)A}\frac{dV}{dt}}} \tag{A15}$$

where βr (m) is the measure of pore radius that is filled at pressure $P_g$, and β is a non-dimensional experimental coefficient that is the square root of the number of pores with the radius r filled at each interval, as can be obtained based on the pressure-time data history from the experiment. Equation (A15) gives a relation between the pore radius and pore volume which is not limited to any specific pore shape. The terms of equation (A15) are measured for sample GUF20 and summarized in Table 7. The incremental water volume intruded per unit time $$\frac{dV}{dt}$$

was used to measure we incremental pore volume at the given pore size distribution and is shown in FIG. 9. Additionally, a good agreement is shown between the incremental pore volume of NMR experiment and the GEIWIP experiment in FIG. 9. The GEIWIP results show higher incremental pore volume with respect to NMR results in capillary pores and macro pores regions, that resulted the higher porosity (see Table 6, $\varnothing_{GEIWIP}$=18.4, and $\varnothing_{NMR}$=17.).

TABLE 7

Incremental water intruded volume per unit time and PSD during GEIWIP test in saturating process for sample GUF20.

| t(s) | $P_c$ (Pa) | $P_g$ (Pa) | V(mL) | $\frac{dV}{dt}\left(\frac{mL}{s}\right)$ | $r_i$ (m) |
|---|---|---|---|---|---|
| 116 | 2.80E+07 | 99448.8 | 3.06413 | 0.000418 | 1.03953E−09 |
| 1098 | 4.08E+06 | 99036.6 | 3.475066 | 6.03E−05 | 7.75771E−09 |
| 7890 | 6.64E+05 | 98628.7 | 3.884442 | 3.18E−05 | 5.78934E−08 |
| 20853 | 1.11E+05 | 98220.7 | 4.296659 | 5.84E−05 | 4.3204E−07 |
| 27959 | 1.85E+04 | 97812.8 | 4.711547 | 0.00014 | 3.22418E−06 |
| 30966 | 0 | 97400.6 | 5.133654 | 8.13E−05 | 2.4061E−05 |
| 36140 | 0 | 96992.7 | 5.554205 | 0.000104 | 0.00017956 |
| 40243 | 0 | 96580.5 | 5.982097 | 8.76E−05 | 0.00134 |
| 45108 | 0 | 96172.6 | 6.408437 | 2.97E−05 | 0.01 |
| 5000 | — | 96172.6 | 6.408437 | 0 | — |

The pore size analysis of porous materials is an important subject in chemical and material engineering, ceramic production, environmental engineering, petroleum engineering and many other fields. The pore size distribution determination can lead to permeability and porosity evaluations and is a good indicator of the complex geometry of the porous matrix. In this experimentation summarized herein, a newly developed core analysis was performed as an efficient and effective way to obtain the pore size distribution of low permeable, porous materials. The cores were chosen to be concrete samples with different binder types and similar aggregates. The experimental method, Gas Expansion Induced Water Intrusion Porosimetry (GEIWIP) was carried out on those concrete samples to obtain their geometrical parameters. The concrete sample was immersed into distilled de-aired water under pressure. Pressure was controlled by argon that was injected and stored in a gas/water accumulator. The change in water within the accumulator resulted in a change of the gas pressure. The pressure change was used to evaluate the pore volume that was intruded by water during the test. The GEIWIP test is based on the water-concrete hydrophilic molecules, whose internal force interactions with each other are more favorable than their interactions with the surrounding air molecules. This intrinsic feature of the water-concrete molecules drives a flow of water into the concrete pores and fills the pores. The porosity measured by GEIWIP test is the total porosity due to the access of water to all pores of the concrete. Therefore, the pore size distribution measured by the GEIWIP test (GEIWIP-PSD) ranged from gel pores (i.e. very fine pores) to coarse pores of the concrete samples. The volume density of each pore size was compared to available Mercury Intrusion Porosimetry (MIP) test data. Comparing to those, GEIWIP-PSD included a wider range of pore sizes. The middle range of pore sizes was in good agreement with the MIP test results.

Since various modifications can be made in my invention as herein above described, and many apparently widely different embodiments of same made, it is intended that all matter contained in the accompanying specification shall be interpreted as illustrative only and not in a limiting sense.

REFERENCES (GEIWIP)

ANOVITZ, L., & COLE, D. 2015. Characterization and Analysis of Porosity and Pore Structures. *Reviews in Mineralogy and Geochemistry*, 80(1), 61-164.

BROWN, C. J., DARWIN, D., & MCCABE, S. L. 1993. Finite Element Fracture Analysis of Steel-Concrete Bond. In Lawrence, Kansas: SM Report No. 36, University of Kansas Center for Research, Inc., 98pp.

CHOI, Y. C., KIM, J., & CHOI, S. 2017. Mercury intrusion porosimetry characterization of micropore structures of high-strength cement pastes incorporating high volume ground granulated blast-furnace slag. *Construction and Building Materials*, 137, 96-103.

DIAMOND, S. 2000. Mercury porosimetry: An inappropriate method for the measurement of pore size distributions in cement-based materials. *Cement and Concrete Research*, 30(10), 1517-1525.

DIAMOND, S., & DOLCH, W. L. 1972. Generalized log-normal distribution of pore sizes in hydrated cement paste. *Journal of Colloid and Interface Science*, 38(1), 234-244.

DU PLESSIS, A., OLAWUYI, B. J., BOSHOFF, W. P., & LE ROUX, S. G. 2016. Simple and fast porosity analysis of concrete using X-ray computed tomography. *Materials and Structures*, 49(1), 553-562.

ERNEST, M. A. 1926. SEVERAL GAS EXPANSION POROSIMETERS1. *Journal of the American Ceramic Society*, 9(12), 814-822.

GAO, Y., WU, K., & JIANG, J. 2016. Examination and modeling of fractality for pore-solid structure in cement paste: Starting from the mercury intrusion porosimetry test. *Construction and Building Materials*, 124, 237-243.

GHAZY, A., & BASSUONI, M. T. 2018. Response of concrete to cyclic environments and chloride-based salts. *Magazine of Concrete Research*, 0(0), 1-15.

GHOURCHIAN, S., WYRZYKOWSKI, M., & LURA, P. 2016. The bleeding test: A simple method for obtaining the permeability and bulk modulus of fresh concrete. *Cement and Concrete Research*, 89, 249-256.

HERBERT, G. 2006. Mercury Porosimetry: A General (Practical) Overview. *Particle & Particle Systems Characterization*, 23(1), 9-19.

KARASTATHIS, A. 2007. Petrophysical measurements on tight gas shale. University of Oklahoma, 117 pp.

KURA, U., MCCARTY, D. K., DERKOWSKI, A., FISCHER, T. B., TOPÓR, T., & PRASAD, M. 2014. Nano-scale texture and porosity of organic matter and clay minerals in organic-rich mudrocks. *Fuel*, 135, 359-373.

LUFFEL, D. L., GUIDRY, F. K., & CURTIS, J. B. 1992. Evaluation of Devonian Shale With New Core and Log Analysis Methods.

MARTYS, N. S., & FERRARIS, C. F. 1997. Capillary transport in mortars and concrete. *Cement and Concrete Research*, 27(5), 747-760.

Monicard, R. P. 1980. Properties of Reservoir Rocks: Core Analysis. Springer Netherlands. XII, 168 pp.

Roy, D. M., Brown, P. W., Ski, D., Scheetz, B. E., & May, W. 1993. Concrete Microstructure Porosity and Permeability. In Washington, D.C.: Strategic Highway Research Program, National Research Council.

Tang, S. W., Cai, X. H., He, Z., Zhou, W., Shao, H. Y., Li, Z. J., Wu, T., & Chen, E. 2016. The review of pore structure evaluation in cementitious materials by electrical methods. *Construction and Building Materials*, 117, 273-284.

Wang, K., Jansen, D. C., Shah, S. P., & Karr, A. F. 1997. Permeability study of cracked concrete. *Cement and Concrete Research*, 27(3), 381-393.

Wang, Y. 1995. Microstructural study of hardened cement paste by backscatter scanning electron microscopy and image analysis.

Wang, Y., & Diamond, S. 1994. An Approach to Quantitative Image Analysis for Cement Pastes. 370(23).

Washburn, E. W. 1921. The Dynamics of Capillary Flow. Physical Review, 17(3), 273-283.

Washburn, E. W., & Bunting, E. N. 1922. POROSITY: VI. DETERMINATION OF POROSITY BY THE METHOD OF GAS EXPANSION*. Journal of the American Ceramic Society, 5(2), 112-130.

Winslow, D., & Diamond, S. 1969. A Mercury Porosimetry Study of the Evolution of Porosity in Portland Cement : Technical Publication. In Lafayette, IN: Joint Highway Research Project.

Xiong, Q., Baychev, T. G., & Jivkov, A. P. 2016. Review of pore network modelling of porous media: Experimental characterisations, network constructions and applications to reactive transport. *Journal of Contaminant Hydrology*, 192, 101-117.

REFERENCES (GEIWIP-PSD)

Anovitz, L., Cole, D., 2015. Characterization and Analysis of Porosity and Pore Structures. Reviews in Mineralogy and Geochemistry, 80(1): 61-164. DOI:10.2138/rmg.2015.80.04

Atkins, P., Paula, J.d., 2010. Physical Chemistry for the Life Sciences. oxford university press.

Baroghel-Bouny, V., 2007. Water vapour sorption experiments on hardened cementitious materials: Part I: Essential tool for analysis of hygral behaviour and its relation to pore structure. Cement and Concrete Research, 37(3): 414-437

Barrett, E. P., Joyner, L. G., Halenda, P. P., 1951. The Determination of Pore Volume and Area Distributions in Porous Substances. I. Computations from Nitrogen Isotherms. Journal of the American Chemical Society, 73(1): 373-380. DOI:10.1021/ja01145a126

Brown, C. J., Darwin, D., McCabe, S. L., 1993. Finite Element Fracture Analysis of Steel-Concrete Bond, SM Report No. 36, University of Kansas Center for Research, Inc., Lawrence, Kansas.

Brun, M., Lallemand, A., Quinson, J.-F., Eyraud, C., 1977. A new method for the simultaneous determination of the size and shape of pores: the thermoporometry. Thermochimica Acta, 21(1): 59-88.

Brunauer, S., Mikhail, R. S., Bodor, E. E., 1967. Pore structure analysis without a pore shape model. Journal of Colloid and Interface Science, 24(4): 451-463.

Bustin, R. M., Bustin, A. M. M., Cui, A., Ross, D., Pathi, V. M., 2008. Impact of Shale Properties on Pore Structure and Storage Characteristics, SPE Shale Gas Production Conference. Society of Petroleum Engineers, Fort Worth, Tex., USA, pp. 28. DOI:10.2118/119892-MS Chang, Q., 2016. Chapter 10—Surface of Solids. In: Chang, Q. (Ed.), Colloid and Interface Chemistry for Water Quality Control. Academic Press, pp. 175-225.

Choi, Y. C., Kim, J., Choi, S., 2017. Mercury intrusion porosimetry characterization of micropore structures of high-strength cement pastes incorporating high volume ground granulated blast-furnace slag. Construction and Building Materials, 137: 96-103.

Clarkson, C. R., 2011. Reservoir Engineering for Unconventional Gas Reservoirs: What Do We Have to Consider? Conference: SPE Unconventional Gas Conference, Woodlands, Tex., USA, 20110614, 20110316. ; Oak Ridge National Lab. (ORNL), Oak Ridge, Tenn. (United States); High Flux Isotope Reactor, Medium: X pp.

Clarkson, C. R. et al., 2013. Pore structure characterization of North American shale gas reservoirs using USANS/SANS, gas adsorption, and mercury intrusion. Fuel, 103: 606-616.

Coussy, O., 2011. Phase Transition in Porous Solids, Mechanics and Physics of Porous Solids. John Wiley and Sons, pp. 296. DOI:doi:10.1002/9780470710388.ch9

Daian, J.-F., 1988. Condensation and isothermal water transfer in cement mortar Part I—Pore size distribution, equilibrium water condensation and imbibition. Transport in Porous Media, 3(6): 563-589. DOI:10.1007/bf00959103

Diamond, S., 1970. PORE SIZE DISTRIBUTIONS IN CLAYS. Clays and Clay Minerals, 18.

Diamond, S., 2000. Mercury porosimetry: An inappropriate method for the measurement of pore size distributions in cement-based materials. Cement and Concrete Research, 30(10): 1517-1525.

Diamond, S., Dolch, W. L., 1972. Generalized log-normal distribution of pore sizes in hydrated cement paste. Journal of Colloid and Interface Science, 38(1): 234-244.

du Plessis, A., Olawuyi, B. J., Boshoff, W. P., le Roux, S. G., 2016. Simple and fast porosity analysis of concrete using X-ray computed tomography. Materials and Structures, 49(1): 553-562. DOI:10.1617/s11527-014-0519-9

Ernest, M. A., 1926. SEVERAL GAS EXPANSION POROSIMETERS1. Journal of the American Ceramic Society, 9(12): 814-822. DOI:doi:10.1111/.1151-2916.1926.tb17961.x Fisher, L. R., Gamble, R. A., Middlehurst, J., 1981. The Kelvin equation and the capillary condensation of water. Nature, 290: 575. DOI:10.1038/290575a0

Gallé, C., 2001. Effect of drying on cement-based materials pore structure as identified by mercury intrusion porosimetry: A comparative study between oven-, vacuum-, and freeze-drying. Cement and Concrete Research, 31(10): 1467-1477.

Gao, Y., Wu, K., Jiang, J., 2016. Examination and modeling of fractality for pore-solid structure in cement paste: Starting from the mercury intrusion porosimetry test. Construction and Building Materials, 124: 237-243.

Ghazy, A., Bassuoni, M. T., 2018. Response of concrete to cyclic environments and chloride-based salts. Magazine of Concrete Research, 0(0): 1-15. DOI:10.1680/jmacr.17.00454

Ghourchian, S., Wyrzykowski, M., Lura, P., 2016. The bleeding test: A simple method for obtaining the permeability and bulk modulus of fresh concrete. Cement and Concrete Research, 89: 249-256.

Giarma, C., 2010. Proposal of an empirical relationship for moisture storage function of concrete. Bauphysik, 32(3): 160-166. DOI:doi:10.1002/bapi.201010020

Gong, F., Zhang, D., Sicat, E., Ueda, T., 2014. Empirical Estimation of Pore Size Distribution in Cement, Mortar, and Concrete. Journal of Materials in Civil Engineering, 26(7): 04014023. DOI:10.1061/(ASCE)MT.1943-5533.0000945

Groen, J. C., Peffer, L. A. A., Perez-Ramirez, J., 2003. Pore size determination in modified micro- and mesoporous materials. Pitfalls and limitations in gas adsorption data analysis. Microporous and Mesoporous Materials, 60(1): 1-17.

Herbert, G., 2006. Mercury Porosimetry: A General (Practical) Overview. Particle & Particle Systems Characterization, 23(1): 9-19. DOI:doi:10.1002/ppsc.200601009

Karastathis, A., 2007. Petrophysical measurements on tight gas shale, University of Oklahoma, 117 pp.

Koronthalyova, O., 2011. Moisture storage capacity and microstructure of ceramic brick and autoclaved aerated concrete. Construction and Building Materials, 25(2): 879-885.

Kuila, U. et al., 2014. Nano-scale texture and porosity of organic matter and clay minerals in organic-rich mudrocks. Fuel, 135: 359-373.

Luffel, D. L., Guidry, F. K., Curtis, J. B., 1992. Evaluation of Devonian Shale With New Core and Log Analysis Methods. DOI:10.2118/21297-PA Martys, N. S., Ferraris, C. F., 1997. Capillary transport in mortars and concrete. Cement and Concrete Research, 27(5): 747-760.

Matsumoto, M., Ogura, D., 1995. AN ANALYSIS OF HEAT AND MOISTURE BEHAVIOR OF UNDERGROUND SPACE AND ITS SURROUNDING GROUND UNDER NATURAL CONDITION. Journal of Architecture and Planning (Transactions of AIJ), 60(474): 27-36. DOI:10.3130/aija.60.27_2

Monicard, R. P., 1980. Properties of Reservoir Rocks: Core Analysis. Springer Netherlands, XII, 168 pp.

Ritter, H. L., Erich, L. C., 1948. Pore Size Distribution in Porous Materials. Analytical Chemistry, 20(7): 665-670. DOI:10.1021/ac60019a025

Rouquerol, F., Rouquerol, J., Sing, K., 1999. CHAPTER 13—General Conclusions and Recommendations. In: Rouquerol, F., Rouquerol, J., Sing, K. (Eds.), Adsorption by Powders and Porous Solids. Academic Press, London, pp. 439-447.

Roy, D. M., Brown, P. W., Ski, D., Scheetz, B. E., May, W., 1993. Concrete Microstructure Porosity and Permeability, Strategic Highway Research Program, National Research Council, Washington, D.C.

Sarkisov, L., Monson, P. A., 2000. Capillary Condensation and Hysteresis in Disordered Porous Materials. In: Unger, K. K., Kreysa, G., Baselt, J. P. (Eds.), Studies in Surface Science and Catalysis. Elsevier, pp. 21-29.

Scherer, G. W., 2005. Mechanisms of frost damage. Materials Science of Concrete, VII. Hokkaido University Press, Sapporo, Japan.

Tanaka, H., Kaneko, K., Matsumoto, A., Unger, K. K., 2000. Rotational State Change of Acetonitrile Vapor on MCM-41 upon Capillary Condensation with the aid of Time-Correlation Function Analysis of IR Spectroscopy. In: Unger, K. K., Kreysa, G., Baselt, J. P. (Eds.), Studies in Surface Science and Catalysis. Elsevier, pp. 251-258.

Tang, S. W. et al., 2016. The review of pore structure evaluation in cementitious materials by electrical methods. Construction and Building Materials, 117: 273-284.

van Genuchten, M. T., 1980. A Closed-form Equation for Predicting the Hydraulic Conductivity of Unsaturated Soils1. Soil Science Society of America Journal, 44(5): 892-898. DOI:10.2136/sssaj1980.03615995004400050002x Wang, K., Jansen, D. C., Shah, S. P., Karr, A. F., 1997. Permeability study of cracked concrete. Cement and Concrete Research, 27(3): 381-393.

Wang, Y., 1995. Microstructural study of hardened cement paste by backscatter scanning electron microscopy and image analysis, Purdue University.

Wang, Y., Diamond, S., 1994. An Approach to Quantitative Image Analysis for Cement Pastes. 370(23).

Washburn, E.W., 1921a. The Dynamics of Capillary Flow. Physical Review, 17(3): 273-283. DOI:10.1103/PhysRev.17.273

Washburn, E. W., 1921b. Note on a Method of Determining the Distribution of Pore Sizes in a Porous Material. Proceedings of the National Academy of Sciences of the United States of America, 7(4): 115-116.

Washburn, E. W., Bunting, E. N., 1922. POROSITY: VI. DETERMINATION OF POROSITY BY THE METHOD OF GAS EXPANSION*. Journal of the American Ceramic Society, 5(2): 112-130. DOI:doi:10.1111/0151-2916.1922.tb17640.x Willis, K. L., Abell, A. B., Lange, D. A., 1998. Image-based characterization of cement pore structure using wood's metal intrusion. Cement and Concrete Research, 28(12): 1695-1705.

Windslow, D., Diamond, S., 1969. A Mercury Porosimetry Study of the Evolution of Porosity in Portland Cement : Technical Publication, Joint Highway Research Project, Lafayette, Ind.

Winslow, N. M., Shapiro, J. J., 1959. Pore Size Distribution in Porous Materials. A.S.T.M. Bull, 236.

Xi, Y., Bažant, Z. P., Jennings, H. M., 1994. Moisture diffusion in cementitious materials Adsorption isotherms. Advanced Cement Based Materials, 1(6): 248-257.

Xiong, Q., Baychev, T. G., Jivkov, A. P., 2016. Review of pore network modelling of porous media: Experimental characterisations, network constructions and applications to reactive transport. Journal of Contaminant Hydrology, 192: 101-117.

The invention claimed is:

1. An apparatus for porosimetric analysis of a material, said apparatus comprising:
   an accumulator tank for holding water therein together with a pressurized gas acting on said water; and
   a sample vessel for holding a material sample within a sealed internal environment of said sample vessel;
   a fluid path by which the sealed internal environment of said sample vessel is fluidly communicable with the accumulator tank to introduce said water from the accumulator tank into said sealed internal environment of the sample vessel under pressure exerted by said pressurized gas;
   a pressure sensor in operably installed relation to the accumulator tank to measure a gas pressure therein; and
   a data acquisition system connected to the pressure sensor and operable to acquire therefrom gas pressure data collected over time during a gas expansion and corresponding pressure drop that occur inside the accumulator tank while the water saturates a sample inside the sample vessel, up to a saturation time at which the pressure drop ceases and the gas pressure stabilizes, whereafter the gas pressure data is usable to calculate intruded water volume in the material sample.

2. The apparatus of claim 1 wherein the sample vessel has an openable/closeable fluid outlet by which an initial volume of said water introduced into the sealed internal environment of the sample vessel can pass through said environment to evacuate air therefrom.

3. The apparatus of claim 1 comprising a water preloader fluidly communicable with the accumulator tank for loading said accumulator tank with a measured quantity of water from said preloader.

4. The apparatus of claim 3 wherein said water preloader comprises a volume measuring container having one or more volume markings thereon for pre-filling of said preloader with said measured quantity of water.

5. The apparatus of claim 3 comprising a loading valve openable and closeable between the water preloader and the accumulator tank.

6. The apparatus of claim 1 comprising a pressure regulator connected to a gas inlet port of the accumulator tank for introduction of the pressurized gas to said accumulator tank through said regulator from a pressurized supply source.

7. The apparatus of claim 1 wherein the accumulator tank comprises an evacuation valve through which ambient air is evacuable therefrom prior to introduction of the pressurized gas.

8. The apparatus of claim 1 comprising an initiation valve openable and closeable between the accumulator tank and the sample vessel to fluidly couple and decouple the accumulator tank and the sample vessel.

9. The apparatus claim 1 in combination with a pressurized supply of said pressurized gas, wherein said pressurized gas is an inert gas.

10. The apparatus of claim 1 in combination with a pressurized supply of said pressurized gas, wherein said pressurized gas is argon.

11. A method of using the apparatus of claim 1, said method comprising:
(a) with the water and the pressurized gas contained within the accumulator tank and with the material sample received in the sample vessel, opening the fluid path between the accumulator tank and the sample vessel, thereby initiating introduction of said water into the sample vessel;
(b) with the sample vessel devoid of ambient air, and with the sealed internal environment of the sample vessel in a fully closed state preventing discharge of the water therefrom, allowing continued flow of said water into the sample vessel until gas pressure in the accumulator tank has stabilized; and
(c) determining a volume of water intruded into the material sample based at least partly on a volumetric change of the pressurized gas in the accumulator tank from an initial time prior to opening of the fluid line in step (a) to a final time after the pressure has stabilized in step (b), and using said determined volume of water to derive one or more porosimetric characteristics of said material sample;
wherein said volumetric change of the pressurized gas is monitored in step (b) by acquisition of the gas pressure data during said gas expansion and said corresponding pressure drop inside the accumulator tank, up to said saturation time at which the pressure drop ceases and the gas pressure stabilizes, and whereafter said gas pressure data is used in step (c) to calculate said volume of water intruded into said material sample.

12. A method of performing porosimetric analysis of a material, said method comprising:
(a) from an accumulator containing water and pressurized gas, using said pressurized gas to force said water from said accumulator into a material sample located within a fully closed or closable environment;
(b) with said environment in a fully closed state from which the water cannot escape, allowing continued flow of said water into the material sample until pressure in the accumulator has stabilized; and
(c) determining a volume of water intruded into the material sample based at least partly on a volumetric change of the pressurized gas in the accumulator from an initial time preceding step (a) to a final time after the pressure has stabilized in step (b), and using said determined volume of water to derive one or more porosimetric characteristics of said material sample;
wherein said volumetric change of the pressurized gas step is monitored in step (b) by measuring a gas pressure inside the accumulator over time during a gas expansion and corresponding pressure drop that occur inside the accumulator while the water saturates said material sample, up to said saturation time at which the pressure drop ceases and the gas pressure stabilizes, and whereafter the measured gas pressure is used in step (c) to calculate said volume of water intruded into the material sample.

13. The method of claim 12 wherein step (a) further comprises initially allowing said water to flow through said environment to evacuate ambient air from said environment before fully closing said environment.

14. The method of claim 13 wherein step (a) further comprises, after having evacuated said ambient air, closing an outlet valve to cease outflow of the water from said environment.

15. The method of claim 12 wherein determining the volume of water in step (c) comprises subtracting an initial volume of the pressurized gas at the initial time and a difference of volume between the material sample and the sealed internal environment of the sample vessel from a final volume of the pressurized gas at the final time.

16. The method of claim 15 wherein determining the volume of water in step (c) further comprises subtracting from said final volume an outflow volume of water that was allowed to escape the internal environment before placement thereof into the fully closed state.

17. The method of claim 12 wherein deriving said one or more porosimetric characteristics comprises determining a porosity of the sample material by dividing the determined volume of water by a bulk volume of the material sample.

18. The method of claim 12 wherein deriving said one or more porosimetric characteristics comprises determining a pore size distribution according to the function $GEIWIP-PSD(r, V)$: $\beta r =$ $$\sqrt{\frac{P_g A}{\pi(P_C - P_g)} + \frac{\rho g}{\pi} \frac{V}{(P_C - P_g)} - \frac{\rho V}{\pi(P_C - P_g)A} \frac{dV}{dt}},$$

where $\rho\left(\frac{\text{kg}}{\text{m}^3}\right)$ is density of water, $g\left(\frac{m}{s^2}\right)$ is acceleration of gravity, V (m³) is the determined volume of water, and $P_g$ is the pressure of gas within the accumulator, A is the surface area of water-gas interface within the accumulator, $P_c$ is capillary pressure, and β is a non-dimensional experimental coefficient that is the square root of the number of pores with the radius r filled at each interval.

\* \* \* \* \*